United States Patent
Colombo et al.

(10) Patent No.: US 12,061,530 B2
(45) Date of Patent: Aug. 13, 2024

(54) PROCESSING SYSTEM, RELATED INTEGRATED CIRCUIT, DEVICE AND METHOD

(71) Applicants: STMicroelectronics Application GMBH, Aschheim-Dornach (DE); STMicroelectronics International N.V., Geneva (CH)

(72) Inventors: Roberto Colombo, Munich (DE); Vivek Mohan Sharma, New Delhi (IN)

(73) Assignees: STMicroelectronics Application GMBH, Aschheim-Dornach (DE); STMicroelectronics International N.V., Geneva (CH)

( * ) Notice: Subject to any disclaimer, the term of this patent is extended or adjusted under 35 U.S.C. 154(b) by 224 days.

(21) Appl. No.: 17/655,103

(22) Filed: Mar. 16, 2022

(65) Prior Publication Data
US 2022/0318109 A1  Oct. 6, 2022

(30) Foreign Application Priority Data
Mar. 30, 2021 (IT) .................. 102021000007871

(51) Int. Cl.
*G06F 11/22* (2006.01)
*G06F 11/07* (2006.01)
*G06F 11/273* (2006.01)

(52) U.S. Cl.
CPC ...... *G06F 11/2273* (2013.01); *G06F 11/0772* (2013.01); *G06F 11/079* (2013.01); *G06F 11/2733* (2013.01)

(58) Field of Classification Search
None
See application file for complete search history.

(56) References Cited

U.S. PATENT DOCUMENTS

2009/0138772 A1    5/2009  Bertacco et al.
2017/0124167 A1*   5/2017  Pasupathy ............... H04L 69/40

FOREIGN PATENT DOCUMENTS

EP      3534261 A1      9/2019
EP      3617723 A1 *    3/2020   ......... G01R 31/3167
JP      2008096325 A *  4/2008

* cited by examiner

*Primary Examiner* — Guerrier Merant
(74) *Attorney, Agent, or Firm* — Slater Matsil, LLP

(57) ABSTRACT

A processing system includes a processing core including a microprocessor, a memory controller configured to read software instructions for execution by the processing core, a plurality of safety monitoring circuits configured to generate a plurality of error signals by monitoring operation of the processing core and the memory controller, a fault collection and error management circuit implemented as a hardware circuit, and a connectivity test circuit. The fault collection and error management circuit is configured to receive the plurality of error signals from the plurality of safety monitoring circuits and generate one or more reaction signals as a function of the plurality of error signals. The connectivity test circuit is configured to, during a diagnostic phase executed by the processing system after executing a reset phase and before executing a software runtime phase, test connectivity between the plurality of safety monitoring circuits and the fault collection and error management circuit.

20 Claims, 9 Drawing Sheets

PROCESSING SYSTEM, RELATED INTEGRATED CIRCUIT, DEVICE AND METHOD

CROSS-REFERENCE TO RELATED APPLICATIONS

This application claims priority to Italian Application No. 102021000007871, filed on Mar. 30, 2021, which application is hereby incorporated herein by reference in its entirety.

TECHNICAL FIELD

Embodiments of the present disclosure relate to the testing of processing systems, such as micro-controllers.

BACKGROUND

FIG. 1 shows a typical electronic system, such as the electronic system of a vehicle, comprising a plurality of processing systems 10, such as embedded systems or integrated circuits, e.g., a Field Programmable Gate Array (FPGA), a Digital Signal Processor (DSP) or a micro-controller (e.g., dedicated to the automotive market).

For example, in FIG. 1 are shown three processing systems $10_1$, $10_2$ and $10_3$ connected through a suitable communication system 20. For example, the communication system may include a vehicle control bus, such as a Controller Area Network (CAN) bus, and possibly a multimedia bus, such as a Media Oriented Systems Transport (MOST) bus, connected to vehicle control bus via a gateway. Typically, the processing systems 10 are located at different positions of the vehicle and may include, e.g., an Engine Control Unit, a Transmission Control Unit (TCU), an Antilock Braking System (ABS), a Body Control Module (BCM), and/or a navigation and/or multimedia audio system. Accordingly, one or more of the processing systems 10 may also implement real-time control and regulation functions. These processing systems are usually identified as Electronic Control Units.

FIG. 2 shows a block diagram of an exemplary digital processing system 10, such as a micro-controller, which may be used as any of the processing systems 10 of FIG. 1.

In the example considered, the processing system 10 comprises a microprocessor 102, usually the Central Processing Unit (CPU), programmed via software instructions. Usually, the software executed by the microprocessor 102 is stored in a non-volatile program memory 104, such as a Flash memory or EEPROM. Thus, the memory 104 is configured to store the firmware of the processing unit 102, wherein the firmware includes the software instructions to be executed by the microprocessor 102. Generally, the non-volatile memory 104 may also be used to store other data, such as configuration data, e.g., calibration data.

The microprocessor 102 usually has associated also a volatile memory 104b, such as a Random-Access-Memory (RAM). For example, the memory 104b may be used to store temporary data.

As shown in FIG. 2, usually the communication with the memories 104 and/or 104b is performed via one or more memory controllers 100. The memory controller(s) 100 may be integrated in the microprocessor 102 or connected to the microprocessor 102 via a communication channel, such as a system bus of the processing system 10. Similarly, the memories 104 and/or 104b may be integrated with the microprocessor 102 in a single integrated circuit, or the memories 104 and/or 104b may be in the form of a separate integrated circuit and connected to the microprocessor 102, e.g., via the traces of a printed circuit board.

In the example considered, the microprocessor 102 may have associated one or more (hardware) resources/peripherals 106 selected from the group of: one or more communication interfaces IF, e.g., for exchanging data via the communication system 20, such as a Universal asynchronous receiver/transmitter (UART), Serial Peripheral Interface Bus (SPI), Inter-Integrated Circuit (I2C), Controller Area Network (CAN) bus, and/or Ethernet interface, and/or a debug interface; and/or one or more analog-to-digital converters AD and/or digital-to-analog converters DA; and/or one or more dedicated digital components DC, such as hardware timers and/or counters, or a cryptographic co-processor; and/or one or more analog components AC, such as comparators, sensors, such as a temperature sensor, etc.; and/or one or more mixed signal components MSC, such as a PWM (Pulse-Width Modulation) driver.

Generally, a dedicated digital component DC may also correspond to a FPGA integrated in the processing system 10. For example, in this case, the memory 104 may also comprise the program data for such a FPGA.

Accordingly, the digital processing system 10 may support different functionalities. For example, the behavior of the microprocessor 102 is determined by the firmware stored in the memory 104, e.g., the software instructions to be executed by a microprocessor 102 of a micro-controller 10. Thus, by installing a different firmware, the same hardware (micro-controller) can be used for different applications.

In this respect, future generation of such processing systems 10, e.g., micro-controllers adapted to be used in automotive applications, are expected to exhibit an increase in complexity, mainly due to the increasing number of requested functionalities (new protocols, new features, etc.) and to the tight constraints of execution conditions (e.g., lower power consumption, increased calculation power and speed, etc.).

For example, recently more complex multi-core processing systems 10 have been proposed. For example, such multi-core processing systems may be used to execute (in parallel) several of the processing systems 10 shown in FIG. 1, such as several ECUs of a vehicle.

FIG. 3 shows an example of a multi-core processing system 10. Specifically, in the example considered, the processing system 10 comprises a plurality of n processing cores $102_1 \ldots 102_n$ connected to a (on-chip) communication system 114. For example, in the context of real-time control systems, the processing cores $102_1 \ldots 102_n$ may be ARM Cortex®-R52 cores. Generally, the communication system 114 may comprise one or more bus systems, e.g., based on the Advanced eXtensible Interface (AXI) bus architecture, and/or a Network-on-Chip (NoC).

For example, as shown at the example of the processing core $102_1$, each processing core 102 may comprise a microprocessor 1020 and a communication interface 1022 configured to manage the communication between the microprocessor 1020 and the communication system 114. Typically, the interface 1022 is a master interface configured to forward a given (read or write) request from the microprocessor 1020 to the communication system 114, and forward an optional response from the communication system 114 to the microprocessor 1020. However, the communication interface 1022 may also comprise a slave interface. For example, in this way, a first microprocessor 1020 may send a request to a second microprocessor 1020 (via the communication interface 1022 of the first microprocessor, the communication system 114 and the communication interface 102$_2$ of the second microprocessor).

Generally, each processing core 102$_1$ ... 102$_n$ may also comprise further local resources, such as one or more local memories 1026, usually identified as Tightly Coupled Memory (TCM).

As mentioned before, typically the processing cores 102$_1$ ... 102$_n$ are arranged to exchange data with a non-volatile memory 104 and/or a volatile memory 104b. In a multi-core processing system 10, often these memories are system memories, i.e., shared for the processing cores 102$_1$ ... 102$_n$. As mentioned before, each processing core 102$_1$ ... 102$_n$ may, however, comprise one or more additional local memories 1026.

For example, as shown in FIG. 3, the processing system 10 may comprise one or more memory controllers 100 configured to connect at least one non-volatile memory 104 and at least one volatile memory 104b to the communication system 114. As mentioned before, one or more of the memories 104 and/or 104b may be integrated in the integrated circuit of the processing system 10 or connected externally to the integrated circuit. For example, the processing system 10 may comprise: a first volatile memory 104b integrated in the integrated circuit of the processing system 10 and connected to the communication system 114 via a first memory controller 100, and a second volatile memory 104b external with respect to the integrated circuit of the processing system 10 and connected to the communication system 114 via a second memory controller 100.

As mentioned before, the processing system 10 may comprise one or more resources 106, such as one or more communication interfaces or co-processors (e.g., a cryptographic co-processor). The resources 106 are usually connected to the communication system 114 via a respective communication interface 1062. In general, the communication interface 1062 comprises at least a slave interface. For example, in this way, a processing core 102 may send a request to a resource 106 and the resource returns given data. Generally, one or more of the communication interfaces 1062 may also comprise a respective master interface. For example, such a master interface 1064 may be useful in case the resource has to start a communication in order to exchange data via (read and/or write) request with another circuit connected to the communication system 114, such as a resource 106 or a processing core 102. For example, for this purpose, the communication system 114 may indeed comprise an Advanced Microcontroller Bus Architecture (AMBA) High-performance Bus (AHB), and an Advanced Peripheral Bus (APB) used to connect the resources/peripherals 106 to the AMBA AHB bus.

Often such processing systems 10 comprise also one or more Direct Memory Access (DMA) controllers 110. For example, as shown in FIG. 3, a DMA controller 110 may be used to directly exchange data with a memory, e.g., the memory 104b, based on requests received from a resource 106. For example, in this way, a communication interface IF may directly read data (via the DMA controller 110) from the memory 104b and transmit these data, without having to exchange further data with a processing unit 102. Generally, a DMA controller 110 may communicate with the memory or memories via the communication system 114 or via one or more dedicated communication channels.

In this respect, irrespective of the complexity of the processing system 10 (e.g., with respect to the number of processing cores 102 and/or number and type of the resources 106), a typical processing system 10 comprises also fault collection and error management circuit 120.

For example, European Patent Application No. EP 3 534 261 A1 discloses possible examples of a fault collection and error management circuit 120, which is incorporated herein by reference for this purpose.

Specifically, as shown in FIG. 4, at least one of the circuits 102, 104 and 106 may generate one or more error signals $ERR_1, \ldots, ERR_m$. For example, such error signals ERR may be generated by at least one of: a memory 104 supporting an error detection and/or correction function, which generates an error signal $ERR_1$ when the data read from the memory 104 contain errors and/or when data could not be written to the memory; a processing core 102 configured to generate an error signal $ERR_2$ in response to a hardware and/or software failure; and a communication interface configured to generate an error signal $ERR_3$, corresponding to a hard error signal indicative of a hardware failure and/or a soft error signal indicative of a data transmission error.

Additionally, one or more error signals may be generated by monitoring the supply voltage of the processing system 10 (e.g., in order to detect over and/or under voltage conditions), the clock signal of the processing system 10 (e.g., in order to detect the absence of a clock signal), and/or the temperature of the processing system 10 (e.g., in order to detect whether the current operating temperate is out of range).

In the example considered, the various error signals $ERR_1, \ldots, ERR_m$ are provided to the fault collection and error management circuit 120. In response to the error signals $ERR_1, \ldots, ERR_m$ the fault collection and error management circuit 120 may execute various operations.

For example, the fault collection and error management circuit 120 may be configured to generate an error trigger signal ET, which is provided to an error pad/pin EP of the integrated circuit comprising the processing system 10, thereby signaling the error event to an external circuit.

Moreover, the fault collection and error management circuit 120 may also provide the error signal(s) ERR to the processing unit 102 and/or to one or more of the resources 106. For this purpose, the fault collection and error management circuit 120 may also generate one or more interrupt signals IRQ, which are provided to the processing unit 102.

For example, FIG. 5 shows a possible implementation of the fault collection and error management circuit 120.

In the example considered, the fault collection and error management circuit 120 comprises a register 1200. Specifically, in the example considered, the register 1200 comprises one or more error bits EB for storing the value of the error signals ERR. For example, considering the exemplary case of three error signals $ERR_1 \ldots ERR_3$, the register 1200 may comprise a corresponding number of error bits EB.

In the example considered, the fault collection and error management circuit 120 comprises also an error trigger generator circuit 1204. Specifically, the error trigger generator circuit 1204 may be configured to generate the error trigger signal ET as a function of the content of the error bits EB of the register 1200. The error bits EB are optional and the error trigger generator circuit 1204 may generate the error trigger signal ET also directly as a function of the error signal(s) ERR.

In general, the behavior of the error trigger generator circuit 1204 may also be programmable, e.g., by setting one or more configuration bits in the register 1200. For example, in the example considered, the register 1200 comprises a respective error trigger enable bit ETE for each of the error signals $ERR_1 \ldots ERR_3$. For example, the content of these error trigger enable bits ETE may be programmed by a processing core 102 and/or during a configuration phase of the processing system 10, e.g., by reading the corresponding configuration information from a non-volatile memory, such as the memory 104.

Thus, essentially the signal ET corresponds to a combined error signal determined by combining the error signals ERR as a function of the error trigger enable bits ETE.

For example, by setting the error trigger enable bits ETE, the processing system 10 may be configured to signal only safety critical errors via the signal ET to the error pin/pad EP (such as uncorrectable data read errors, hardware failure of the processing unit 102 and/or one of the resources 106, etc.). Conversely, minor errors, which do not influence the safety of the system may not be signaled to the error pin/pad EP. For example, assuming a memory with error correction function, an uncorrectable error (e.g., a three bits error upon reading data from a non-volatile memory able to correct up to two-bit errors) may be: safety critical, e.g., when reading (fetching) code to be executed from the memory, insofar as this may result in an incorrect execution behavior; or not safety critical, e.g., when reading the data of a JPEG picture from the memory.

Accordingly, due to an error, the circuits of the processing system 10 may not operate correctly, possibly generating incorrect signals at the pins/pads of the processing system 10. Some of the pins/pads of the processing system 10a may thus be safety-critical pins/pad, i.e., pins/pads which may generate critical situations when driven incorrectly. For example, in FIG. 4 is shown schematically a first safety-critical pin SCP1 which is driven by a processing core 102 and a second safety-critical pin SCP2 which is driven by a resource/peripheral 106, such as a communication interface or a PWM half-bridge driver.

Generally, each input/output pin/pad of the processing system 10 has usually associated a respective driver circuit IO, which is configured to drive the respective pin/pad as a function of the signal received from the respective block, e.g., the processing system 102 and the hardware resources 106. Generally, between the driver circuits IO and the blocks of the processing system 10a may also be arranged a dedicated logic, such as one or more multiplexers, permitting a configuration of the pin-mapping.

Accordingly, in line with the disclosure of document EP 3 534 261 A1, the driver circuit IO of a safety-critical pins/pads SCP may be configured to set the output level of the respective pin to a given safety state in response to a signal SET. The output level, such as a high-impedance state or a given logic level (high or low), may depend on the specific application needs. Preferably such a "safety state" is compliant to the ISO2626 specification.

Accordingly, the fault collection and error management circuit 120 may be configured to generate also the signal SET for the driver circuits IO in order to put one or more of the safety-critical pins/pads SCP into a safety state. For example, the signal SET may correspond to the signal ET. Alternatively, the circuit 1204 may be configured to generate the signal SET as a function of the error bits EB and possible one or more configuration bits stored in the register 1200 (similar to the bits ETE).

Accordingly, in the example considered, the forwarding of the errors ERR to the error pin EP (and thus an external device) and optionally the switching of the pins/pads SCP are independent from the operation of the processing unit 102, e.g., the software executed by a microprocessor 102.

In addition to or as alternative to controlling the external behavior of the processing system 10 (error pins EP and/or safety-critical pins SCP), the fault collection and error management circuit 120 may also generate one or more internal signals, such as the generation of an (non-maskable or maskable/configurable) interrupt signal IRQ and/or a reset signal RST, the activation of a diagnostic mode, etc. For example, the one or more interrupts IRQ may be provided to the processing core(s) 102 in order to trigger a given software routine, while the reset signal RST may reset one or more circuits of the processing system 10 (or possibly the complete processing system 10).

Generally, the error trigger signal ET may also be used for this purpose. Conversely, in the example shown in FIG. 5, the fault collection and error management circuit 120 comprises an additional internal reaction circuit 1202. Specifically, the internal reaction circuit 1202 may be configured to generate one or more interrupt signals IRQ and/or reset signals RST as a function of the error bits EB or directly the signals ERR. Generally, the internal reaction circuit 1202 is optional, because the processing system 10 may also not perform any internal reaction in response to the error signals ERR.

Generally, also the behavior of the internal reaction circuit 1202 may be programmable, e.g., by setting one or more configuration bits in the register 1200. For example, in the example considered, the register comprises (in addition to the error trigger enable bits ETE) a respective interrupt enable bit IE for each of the error signals $ERR_1 \ldots ERR_3$. For example, the content of these interrupt enable bits IE may be programmed by the processing unit 102 and/or during a configuration phase of the processing system 10, e.g., by reading the corresponding configuration information from a non-volatile memory, such as the memory 104a.

In order to simplify the data exchange between the processing unit 102 and the registers 1200, the register 1200 may be directly addressable by the processing unit 102, which is schematically shown in FIG. 3, where the fault collection and error management circuit 120 is connected to the communication system 114.

As mentioned before, the fault collection and error management circuit 120 may receive a significant number or error signals ERR from different circuits of the processing system. For example, this applies in particular to complex multi-core processing systems 10. For example, in the context of automotive applications, multiple functionalities, such as braking, airbag control, powertrain, etc., may be integrated on the same processing system. However, in this context, also the safety requirements prescribed by the ISO26262 specification have to be satisfied.

Typically, as shown in FIG. 6, the hardware error signals ERR are generated by dedicated safety monitor circuits SM. For example, such safety monitor circuits may comprise combinational and/or sequential logic circuits, which monitor the operation of a given circuit. Generally, such safety monitor circuits SM may also comprise analog components, e.g., in order to detect an out-of-range condition for an analog signal, such as an internal supply voltage or a signal indicative of the operating temperature of the processing system or a specific circuit of the processing system.

For example, FIG. 6 shows a safety monitor circuit $SM_{104}$ configured to monitor one or more signals of the memory 104, a safety monitor circuit $SM_{102}$ configured to monitor one or more signals of a processing core 102 and a safety monitor circuit $SM_{106}$ configured to monitor one or more signals of a resource/peripheral 106. Generally, the safety monitor circuit may also be integrated in the respective circuit.

Accordingly, typically each safety monitor circuit SM monitors one or more signals generated by and/or provided to the associated circuit, and determines whether the behavior of the signal(s) is normal or indicates an error. In general, the operations performed by a given safety monitor circuit SM depend on the associated circuit and may include, e.g.: a combinational analysis, e.g., by combining the signals of the associated circuit in order to determine whether the signal levels are congruent; a sequential analysis, e.g., by comparing the time evolution of one or more signals with one or more reference signals; an analysis of one or more analog signals, e.g., by comparing the value of an analog signal with one or more reference values; or a combination of the above analyses in order to implement a more complex abnormal behavior analysis.

For example, as mentioned before, the safety monitor circuit $SM_{104}$ may correspond to an error detection circuit of the memory 104, which calculates (via combinational and optionally sequential logic operations) an error correction code for the data read from the memory and compares (via combinational logic operations) the calculated error correction code with an error correction code read from the memory. Conversely, the safety monitor circuit $SM_{102}$ may comprise a watch-dog timer configured to generate error signals when the associated processing core does not reset the watch-dog timer in a given period of time.

Accordingly, in response to determining an abnormal behavior, the safety monitor circuit SM may assert a respective error signal ERR, which signals the error to the fault collection system 120.

Accordingly, the fault collection and error management circuit 120 may be a complex system, including also the connections within the integrated circuit between the fault collection and error management circuit 120 and the various safety monitor circuits SM. Moreover, the operation of the fault collection and error management circuit 120 itself is safety relevant. For example, a non-reported error, for example because the error signal is stuck or the connection is broken, may create dangerous situation, e.g., in the context of automotive applications.

SUMMARY

In view of the above, various embodiments of the present disclosure provide for testing the correct functionality of the connection between a safety monitor and the fault collection and error management circuit of a processing system.

As mentioned before, various embodiments of the present disclosure relate to a processing system. In various embodiments, the processing system, e.g., implemented in an integrated circuit, comprises a digital processing core comprising a microprocessor programmable via software instructions, a memory controller configured to read the software instructions from a non-volatile memory, a resource/peripheral and a communication system connecting the processing core to the memory controller and the resource.

In various embodiments, a plurality of safety monitoring circuits are configured to generate a plurality of error signals by monitoring the operation of the processing core, the memory controller and/or the resource. For example, each safety monitoring circuit may be configured to monitor one or more signals of the processing core, the memory controller and/or the resource and perform at least one of: a combinational analysis of one or more monitored digital signals; a sequential analysis of one or more digital monitored signals; and an analysis of one or more monitored analog signals, e.g., by comparing the value of an analog signal with one or more reference values.

In various embodiments, a fault collection and error management circuit is configured to receive the error signals from the safety monitoring circuits, and generate one or more reaction signals as a function of the plurality of error signals. For example, the fault collection and error management circuit may generate at least one of: an interrupt signal, a reset request signal, a first digital signal provided to a terminal/pin of the processing system, and a second digital signal used to set the output level of one or more safety critical terminals of the processing system.

In various embodiments, the processing system comprises also a reset circuit configured to selectively reset the processing system, and a diagnostic circuit configured to selectively execute one or more tests of the processing system. Specifically, in response to switching on the processing system, the processing system is configured to execute the following phases in sequence: a reset phase, where the reset circuit executes a reset of the processing system; a diagnostic phase, where the diagnostic circuit executes the one or more tests of the processing system; and a software runtime phase, where the microprocessor is started and executes software instruction.

In various embodiments, the processing system comprises also a hardware connectivity test circuit configured to test, during the diagnostic phase, the connectivity between the plurality of safety monitoring circuits and the fault collection and error management circuit, wherein the connectivity test circuit comprises for each error signal a circuit configured to selectively assert or de-assert the respective error signal generated by a respective safety monitoring circuit as a function of a respective selection signal. For example, each circuit may comprise a first combinational logic gate configured to selectively assert the respective error signal as a function of a first bit of the selection signal, and a second combinational logic gate configured to selectively de-assert the respective error signal as a function of a second bit of the selection signal.

In various embodiments, a control circuit of the connectivity test circuit may set the selection signals in order to de-assert a first subset of the error signals via the circuit, and determine whether the respective error signals of the first subset received by the fault collection and error management circuit are de-asserted.

In parallel to, before or after the above-mentioned operation, the control circuit may set the selection signals in order to assert a second subset of the error signals via the circuit, and determine whether the respective error signals of the second subset received by the fault collection and error management circuit are asserted.

Accordingly, in various embodiments, in response to determining that at least one of the error signals of the first subset received by the fault collection and error management circuit is not de-asserted or at least one of the error signals of the second subset received by the fault collection and error management circuit is not asserted, the control circuit may set a status signal to a value indicating an error of the connectivity test.

For example, in various embodiments, the first subset of the error signals comprises all error signals, i.e., the control circuit sets the selection signals in order to de-assert all error signals via the circuit, and determines whether all error signals received by the fault collection and error management circuit are de-asserted.

In various embodiments, the second subset of the error signals comprises a single error signal, i.e., the control circuit sets the selection signals in order to selectively assert the single error signal via the circuit, and determines whether the respective single error signal received by the fault collection and error management circuit is asserted. In this case, the control circuit may sequentially assert different single error signals.

In various embodiments, parallel tests may be performed. In this case, the processing system comprises a plurality of connectivity test circuits configured to test, during the diagnostic phase, the connectivity between respective subsets of the safety monitoring circuits and the fault collection and error management circuit.

For example, in order to implement the above tests, the control circuit may comprise one or more registers configured to provide the selection signals, and a state machine configured to control the operation of the one or more registers in order to set the selection signals in order to de-assert the first subset of the error signals and assert the second subset of the error signals. In order to implement the sequential test, the one or more registers may be shift registers.

In various embodiments, one or more test may also be performed via software instructions. In this case, the processing system may comprise one or more further registers connected to the communication system and programmable via software instructions executed by the microprocessor, and a combinational logic circuit configured to generate the selection signals by combining the signals provided by the one or more registers and the one or more further registers.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

In the following FIGS. 7 to 12 parts, elements or components which have already been described with reference to FIGS. 1 to 6 are denoted by the same references previously used in such Figure; the description of such previously described elements will not be repeated in the following in order not to overburden the present detailed description.

Figure 7:
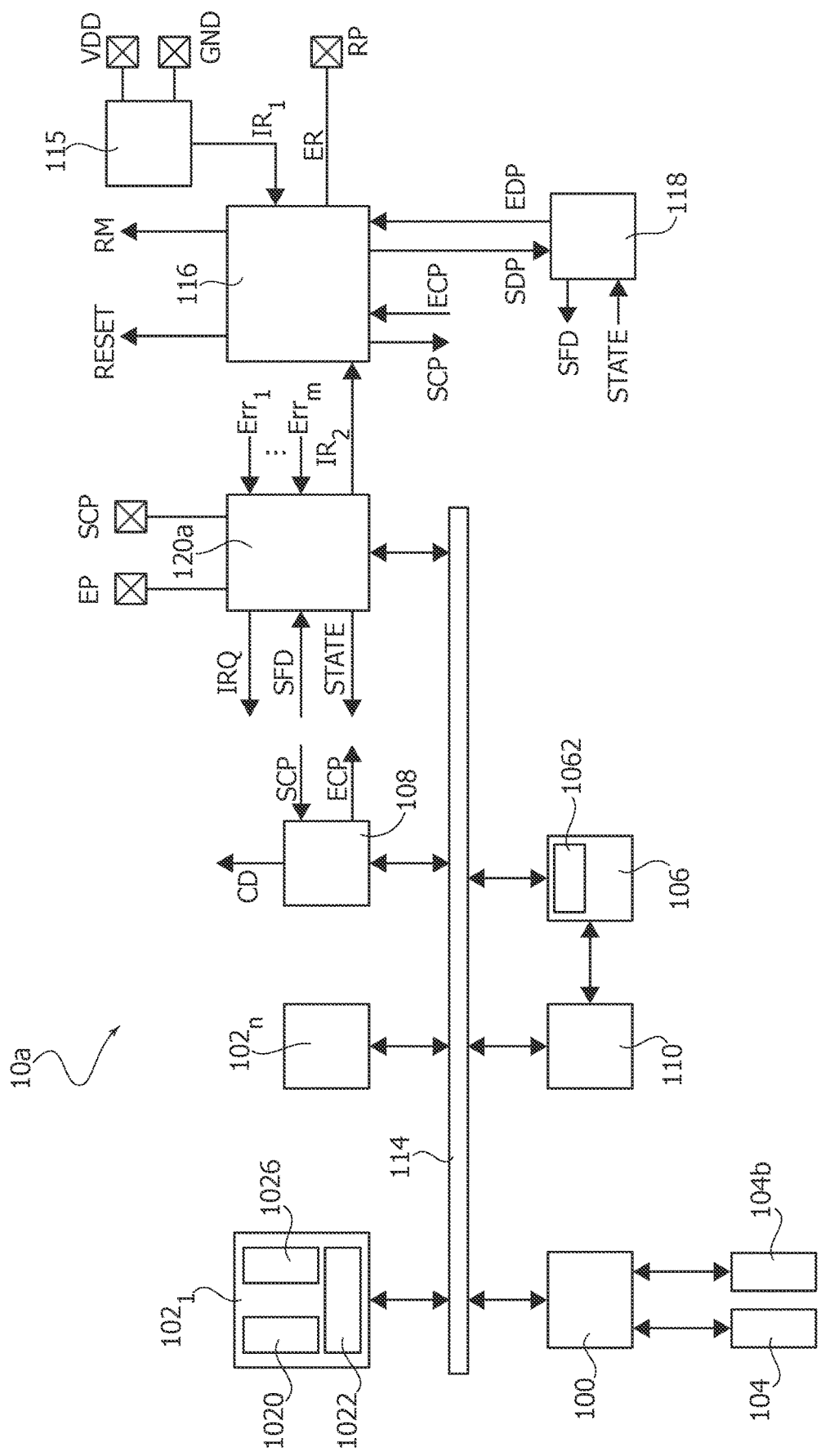
FIG. 7 shows an embodiment of a processing system according to the present disclosure, wherein the processing system comprises a fault collection and error management circuit and a diagnostic circuit.

FIG. 7 shows an embodiment of a processing system 10a according to the present description.

In the embodiment considered, the underlying architecture of the processing system 10a corresponds to the processing system described with respect to FIGS. 1 to 6, and the respective description applies in their entirety. Thus, also in this case, the processing system 10a, such as an integrated circuit, comprises: at least one circuit configured to generate an error signal ERR, such as a processing core 102 comprising a microprocessor 1020, a memory controller 100 configured to be connected to a (internal or external) non-volatile memory 104 and/or a volatile memory 104b, and/or a resource/peripheral 106; and a fault collection and error management circuit 120a.

Specifically, in various embodiments, the processing system 10a comprises also: a reset management circuit 116; and a diagnostic circuit 118.

In various embodiments, the processing system may also comprise a hardware configuration circuit 108. For example, in line with the description of European Patent Application No. EP 3 413 194 A1, the configuration data CD may be written into specific areas of the non-volatile memory 104 and retrieved when the processing system 10a is powered on. Preferably, the non-volatile memory 104 is integrated in the integrated circuit and may also be used to store the firmware of the processing core(s) 102. However, the firmware may also be stored in a separate non-volatile memory 104. For example, the non-volatile program memory may be used, in case the program memory is integrated in the integrated circuit. Conversely, an additional internal non-volatile memory 104 may be used in case the program memory is an external memory. Accordingly, in various embodiments, the configuration data CD are stored in a non-volatile memory of the integrated circuit comprising the blocks requiring configuration data, such as the processing unit 102, one or more of the hardware resources 106, the fault collection and error management circuit 120a, the reset management circuit 116 and/or the diagnostic circuit 118.

For example, the configuration data CD may comprise calibration data used to guarantee that the hardware behavior is uniform, thereby compensating possible production process tolerances. For example, this applies often to the calibration of analog components of the processing system, such as a temperature sensor, analog-to-digital converter, voltage reference, etc. For example, a voltage monitor threshold level of an analog comparator could be "trimmed" to the exact intended value by adjusting some levels with configuration/calibration data, which are written by the producer of the hardware of the processing systems, e.g., the micro-controller producer. Moreover, the configuration data CD may also be used to customize the behavior of the hardware.

In various embodiments, the hardware configuration module 108 may be configured to read the configuration data CD from the non-volatile memory 104 by sending read requests to the memory controller 100 via the communication system 114. Additionally or alternatively, the hardware configuration module 108 may also be connected directly to the memory controller 100 or be configured to read directly the data from the memory 104.

Similarly, the hardware configuration module 108 may be configured to send the configuration data CD to the various circuits by sending write requests via the communication system 114. However, the hardware configuration module 108 may also use a separate communication channel for the configuration data CD.

For example, in line with the description of document EP 3 413 194 A1, each circuit requiring configuration data may have associated one or more configuration data client, which may also be integrated in the respective circuit. For example, the configuration module 108 and the configuration data clients may be connected via the communication system 114 or an additional bus, and each configuration data clients may have associated a respective target address. Accordingly, each configuration data client may be configured to receive the configuration data from the module 108, store them into the internal register, e.g., store them into one or more internal flip-flops or latches. The data stored in the register may then be used to generate one or more signals, which influence the behavior of one or more associated circuits.

Accordingly, in line with the description of document EP 3 413 194 A1, the configuration circuit 108 may comprise: a data read module configured to read the configuration data CD from the memory 104, a dispatch module configured to transmit the configuration data to the configuration data clients, and a state control module configured to manage the various configuration phases of the processing system 10a.

For example, the communication between the dispatch module and the configuration data clients may be based on data frames in accordance with a given format, called Device Configuration Format (DCF). For example, each data frame may comprise two fields: the payload (i.e., the real data), called DCF Format payload, and possible additional data attributes used to identify the receiver of the data, called DCF Format attributes, wherein the receiver is one of the configuration data clients representing a DCF client. For example, the data attributes may consist in 16 or 32 bits, wherein a given number of bits specifies the address of one of the configuration data clients, and the payload may consist in 16 or 32 bits. For example, in this case, the data read module of the configuration circuit 108 may be configured to read blocks of 64 bits from the memory 104, wherein the first 32 bits contain the data attributes (including the address of a configuration data client) and the second 32 bits contain the configuration data to be transmitted to the address specified in the data attributes. As mentioned before, the address may correspond to a physical address of the communication system 114 or of a separate communication bus.

For example, as shown in FIG. 7, in various embodiments, once the processing system 10a is switched-on, the reset module 116 of the processing system 10a may generate a reset signal RESET, which is used to perform a reset of the various components of the processing system 10a. For example, the processing circuit 10a may comprise for this purpose a power supply monitoring circuit 115 configured to generate a trigger in a reset request signal $IR_1$, when the supply voltage applied to terminals VDD and GND increase above a given threshold value. For example, the power supply monitoring circuit 115 may comprise for this purpose a comparator, e.g., a comparator with hysteresis, i.e., a Schmitt trigger. Accordingly, in this way, the processing system 10a is reset when the processing system 10 is switched on. For example, the reset signal RESET may correspond to a reset pulse of a given number of clock cycles, provided to the circuits of the processing system 10a.

Similarly, in response to a reset, the reset circuit 116 may activate the state control module of the configuration circuit 108, thereby activating the configuration phase.

As disclosed in European Patent Application No. EP 3 719 636 A1, and which is incorporated herein by reference for this purpose, indeed two types of resets may be used in conventional processing systems. The first reset corresponds to a "simple" reset as described essentially in the foregoing, where some kind of reset event activates the internal reset stage 116 in order to perform a reset of the processing system. The second type of reset corresponds to a complex reset wherein further operations may be executed.

Figure 8:
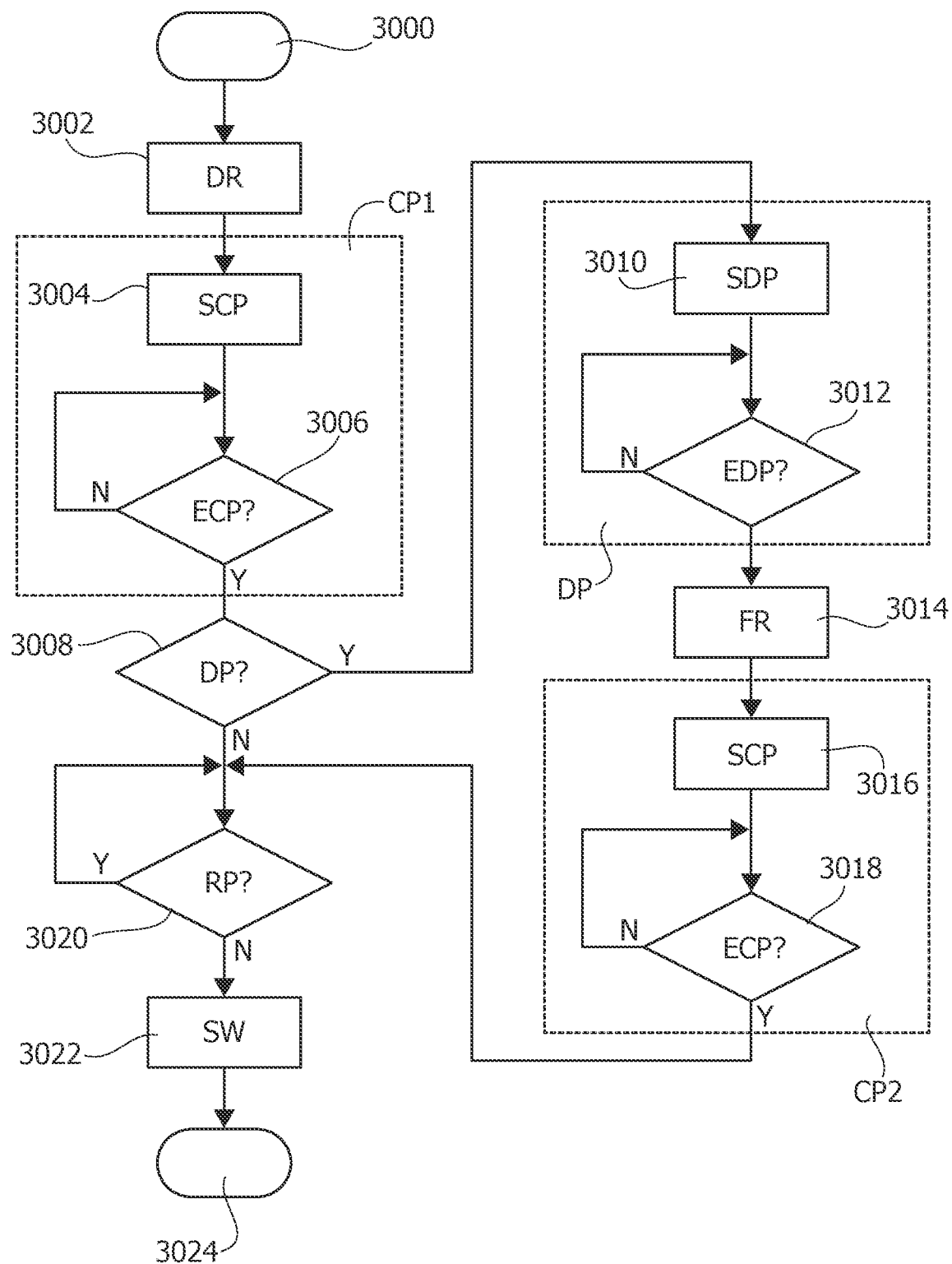
FIG. 8 is a flow-chart showing an embodiment of the operation of the processing system of FIG. 7.

FIG. 8 schematically shows an embodiment of the operation of the reset circuit 116.

At a step 3000 the reset circuit 116 is activated and a reset is performed at a step 3002. For example, the reset module 116 may set the signal RESET at the step 3002. Accordingly, in response to the reset requested at the step 3002, the various latches/registers of the processing system 10a are reset (e.g., the processing core(s) 102 and the resources 106).

Next, in case the configuration circuit 108 is used, the reset module 116 starts at a step 3004 the configuration phase, e.g., by setting a signal SCP, which is provided to the state control module of the configuration circuit 108. In response to the signal SCP, the configuration circuit 108 reads and distributes the configuration data CD. Generally, the signal SCP is optional because the configuration phase could be started automatically when the reset signal RESET is de-asserted.

At the end of the configuration phase, the configuration circuit 108 may set a signal ECP in order to indicate that the configuration phase is completed.

Accordingly, as shown in FIG. 8, the reset circuit 116 may proceed from the step 3004 to a verification step 3006, where the reset module 116 waits until the signal ECP is set by the configuration circuit 108 (output "N" of the verification step 3006). Once the signal ECP is set (output "Y" of the verification step 3006), the processing system 10a is configured. Accordingly, the steps 3004 and 3006 implement a configuration phase CP1 of the processing system 10a. As mentioned before, due to the fact that the configuration circuit 108 is optional, the configuration phase CP1 is also optional.

Accordingly, in general, after the verification step 3006, the processing core(s) 102 may be started at a step 3022 and the reset procedure may terminate at a step 3024. Accordingly, at the step 3022 is started a software runtime phase SW.

Substantially, the reset phase 3002 and the configuration phase CP1 implement a reset stage, where the various circuits of the processing system are reset and then the configuration data CD are distributed, thereby storing given values to the registers and/or internal flip-flops of the processing system 10a prior to starting the processing core (s) 102.

However, as shown in FIG. 8, the processing system 10a may also be configured to run a diagnostic phase DP where the processing system 10a executes one or more optional system diagnostic operations, i.e., the processing system 10a executes a Built-In Self-Test (BIST). For example, in the embodiment shown in FIG. 7, the processing system 10a comprises a hardware diagnostic circuit 118, which is activated via a signal SDP.

Accordingly, in various embodiments, once the signal ECP is set (output "Y" of the verification step 3006), the reset circuit 116 may set the signal SDP at a step 3010, thereby starting the diagnostic circuit 118. Next, the reset module 116 may wait at a step 3012 until the diagnostic operations have been executed, i.e., the self-test has been completed. For example, as shown in FIG. 7, the diagnostic circuit 118 may set a signal EDP once the diagnostic operations have been executed.

Accordingly, as shown in FIG. 8, the reset circuit 116 may proceed from the step 3010 to a verification step 3012, where the reset module 116 waits until the signal EDP is set by the diagnostic circuit 118 (output "N" of the verification step 3012). Once the signal EDP is set (output "Y" of the verification step 3012), the diagnostic phase DP (steps 3010 and 3012) has been completed.

In various embodiments, the self-test operations executed by the diagnostic circuit 118 may test one or more registers of the processing system 10a, which usually involves write and/or read operations, thereby modifying the content of such registers or internal flip-flops.

Accordingly, in various embodiments, once having executed the diagnostic phase DP, the reset module 116 may execute a further reset of the processing system 10a at a step 3014. For example, the reset circuit 116 may set again the signal RESET at the step 3014.

Generally, the reset executed at the step 3002, representing a first reset, and the reset executed at the step 3016, representing a second reset, may be different, e.g., with respect to the registers and/or circuits which are reset by the reset circuit 116. For example, this is schematically shown in FIG. 7, where the reset circuit 116 generates also a reset mode signal RM, which is set to a first logic level at the step 3002 and a second logic level at the step 3014. However, the reset circuit could also set a first reset signal RESET1 at the step 3002 (used to reset a first sub-set of circuits) and a second reset signal RESET2 at the step 3014 (used to reset a second sub-set of circuits).

In various embodiments, the diagnostic circuit 118 may also test the registers of one or more of the configuration data clients used to distribute the configuration data CD. Accordingly, in this case, it is also useful to read again the configuration data CD at a second configuration phase CP2. As mentioned before, due to the fact that the configuration circuit 108 is optional, the configuration phase CP2 is also optional.

Accordingly, in various embodiments, the reset module 116 may proceed from the step 3014 to a step 3016, where the reset circuit 116 starts again a configuration phase, e.g., by setting a signal SCP, which is provided to the state control module 1084. In response to the signal SCP, the configuration circuit 108 reads and distributes the configuration data CD. At the end of the configuration phase, the configuration circuit 108 sets again the signal ECP in order to indicate that the configuration phase is completed.

Accordingly, the reset circuit 116 may proceed from the step 3016 to a verification step 3018, where the reset module 116 waits until the signal ECP is set by the configuration circuit 108 (output "N" of the verification step 3018). Once the signal ECP is set (output "Y" of the verification step 3018), the processing circuit may thus proceed to the step 3022 for starting the processing core(s) 102.

Substantially, the reset phase 3014 and the configuration phase CP2 implement a further reset stage, where the various circuits of the processing system are again reset and then the configuration data CD are distributed.

As mentioned before, the reset circuit 116 may be configured to optionally start the diagnostic phase DP after the configuration phase CP1. This configuration may be hardwired or programmable. Specifically, as mentioned before, in various embodiments, the optional configuration data CD are already distributed at the end of the configuration phase CP1. Accordingly, the configuration data CD may also include data which indicate whether the self-test function should be activated or not, possibly also including data specifying which self-test should be executed. For example, these data may be provided to the reset circuit 116 and/or the diagnostic circuit by associating respective configuration data clients with these circuits.

According, at the end of the step 3006, the reset circuit 116 may indeed proceed to a verification step 3008. Specifically, when the execution of the diagnostic phase DP is enabled (output "Y" of the verification step 3008), the reset module 116 proceeds to the step 3010. Conversely, when the execution of the self-test is disabled (output "N" of the verification step 3008), the procedure may directly proceed to the step 3022 in order to start the normal-operation mode of the processing system.

Thus, essentially, a simple reset implements only a single reset (step 3002) and the optional configuration phase CP1. Conversely, a complex reset implements also the diagnostic phase DP and optionally the further reset at the step 3014 and optionally the further configuration phase CP2. Generally, as mentioned before, the processing system 10a may also support both types of resets, wherein a complex reset is executed in response to a first set of events and a simple reset is executed in response to a second set of events (e.g., verified at the step 3008). For example, a complex reset may be executed in response to a start-up of the processing system 10a or in response to given (critical) errors, while a simple reset may be executed in response to a reset request by the processing unit 102. For example, as shown in FIG. 7, the fault collection and error management circuit 120a may provide for this purpose one or more reset request signals $IR_2$ to the reset management circuit 116. Generally, the type of reset to be triggered in response to a given reset request signal $IR_2$ may be static/hardwired or may be configurable.

Typically, the first reset at the step 3002 is called "destructive reset" DR, because usually all registers of the processing system 10a are reset to a reset value, while the second reset at the step 3014 is usually identified as a functional reset FR, because not necessarily all registers of the processing system are reset, such as registers of one or more of the resources 106. For example, the registers of the reset module 116 cannot be reset at the step 3016, because otherwise the reset module 116 would lose the information whether already a first reset at the step 3002 had been performed. Generally, in case the BIST does not test the registers of the configuration data clients 112, the functional reset at the step 3014 may also be a so called "Short Functional Reset", where the processing system 10a is reset but the configuration circuit 108 does not read again the configuration data CD, i.e., the configuration phase CP2 may be omitted also in case the configuration circuit 108 is used.

As described in the foregoing, given reset request signals (such as the signal $IR_1$ indicating a power-on of the processing system 10*a*) may trigger the complex reset procedure shown in FIG. 7 (starting at a destructive reset 3002), while other reset request signals (e.g., a reset requested by a resource 106 or the error management circuit 120*a*) may trigger only a functional reset, i.e., start immediately the step 3014. Moreover, further reset request signals (e.g., a reset requested by a processing unit 102) may trigger only a short functional reset. Typically, the reset requests are classified as functional, short functional or destructive at design time, and/or may be configured via configuration data CD. Similarly, as mentioned before, the execution of the BIST may be set at design time, and/or may be configured via configuration data CD, possibly for each trigger associated with a destructive reset.

Accordingly, in various embodiments, when executing a complex or simple reset, i.e., between the steps 3002 and 3020, the processing core(s) 102 are not running, i.e., the processing core(s) 102 do not execute any software. For example, this may be obtained by keeping the processing core(s) 102 under reset. Conversely, other circuits of the processing system 10*a* may be operative, e.g., the reset circuit 116, the diagnostic circuit 118, the hardware configuration circuit 108, the non-volatile memory 104, one or more of the resources 106, etc. In this respect, the reset circuit 116 and/or the state control module of the configuration circuit 108 may also implement further steps, such as an initialization phase, where the reset circuit 116 and/or the state control module, e.g., wait that the non-volatile memory 104 completes its initialization, thereby ensuring that the data read circuit of the configuration circuit 108 may read the configuration data CD from the non-volatile memory 104.

As shown in FIG. 7, in various embodiments, the reset circuit 116 may be configured to reset the processing system 10*a* in response to a reset request signal ER received via a reset terminal RP of the processing system 10*a*, such as a pad of a respective integrated circuit die or a pin of a respective packaged integrated circuit. In this case, the reset circuit 116 may be configured to verify whether the signal ER applied to the reset terminal RP is asserted/has a first logic level, e.g., is low. For example, in this case, the processing system 10*a* may be configured to start a complex reset at the step 3000 when the signal applied to the reset terminal RP has the first logic value, e.g., low. Next the reset circuit executes the steps 3002 to 3018, and the processing system 10*a* remains at a step 3020 while the signal applied to the reset terminal RP is asserted/has the first logic level (output "Y" of the verification step 3020), i.e., the processing system 10*a* proceeds from the step 3020 to the step 3022 (output "N" of the verification step 3020) when the logic level of the signal applied to the reset terminal RP is de-asserted/has a second logic level, e.g., high. Accordingly, in the embodiment considered, the processing core(s) are only started at the step 3022 when the signal applied to the reset terminal RP is de-asserted/has the second logic level.

Generally, while FIG. 7 shows an embodiment where the various reset phases are managed by the reset circuit 116, these phases could also be managed by the state control circuit of the configuration circuit 108 or another state machine. Thus, in general the operation shown in FIG. 7 may be implemented in any suitable manner by the processing system 10*a*.

As mentioned in the foregoing, in various embodiments, the processing system 10*a* is configured to also test the fault collection and error management circuit 120*a*. For example, as mentioned before, in various embodiments, also the connection between the safety monitoring circuits SM (which are usually located near the respective circuit to be monitored) and the fault collection and error management circuit 120*a* (which is usually centralized for the processing system 10*a*) should be verified.

Generally, the behavior of the safety monitor circuits SM and the fault collection and error management circuit 120*a* could be verified via software instructions executed by a processing core 102. For example, for this purpose, the processing core 102 may send requests via the communication system 10*a* to each safety monitor circuit SM (or the respective associated circuit), wherein the request corresponds to an instruction to simulate a given error event. Accordingly, by monitoring the error bits EB of the fault collection and error management circuit 120*a*, e.g., by sending respective read requests via the communication system 114, a processing core may verify the correct transmission of the error signals ERR. Similarly, the processing core 102 may enable one or more interrupts IRQ generated by the fault collection and error management circuit 120*a*, e.g., by programming the bits IE.

Accordingly, the testing of the safety monitor circuits SM, the fault collection and error management circuit 120*a* and the connection between these circuits may be controlled via software instructions executed via a processing core 102, wherein the software instructions perform write and read requests to various registers of the safety monitor circuits SM (or the respective associated circuits) and the fault collection and error management circuit 120*a*.

However, when increasing the number of circuits and/or functionalities to be monitored, also the number of the safety monitor circuits SM or at least the number of error signals ERR generated by these safety monitor circuits SM increases, which may render such a software-based solution rather inefficient in terms of software complexity and execution time.

In fact, increasing the complexity of software implies investing in resources and scheduling within the project significant time to develop the corresponding software routines (for example each safety monitor may have a different mode to inject a fault via software).

Moreover, due to the fact that the test routines should be executed at least during the start-up of the processing system 10*a*, the software test routines have to be included in the firmware of the final application. On the one hand, this implies that memory area has to be allocated to these routines, thereby increasing the cost of the processing system. On the other hand, a significant time may be dedicated to these tests during the initialization of the processing system. However, the overall boot time may be constrained, thus not permitting the execution of all software test routines.

Accordingly, in various embodiments, the diagnostic circuit 118 and the fault collection and error management circuit 120*a* may be configured to execute one or more self-test operations during the diagnostic phase DP. For example, this is shown in FIG. 7, where the diagnostic circuit 118 provides a diagnostic request signal SFD to the fault collection and error management circuit 120*a* and the fault collection and error management circuit 120*a* returns one or more diagnostic status signals STATE to the diagnostic circuit 118.

Accordingly, in various embodiments, a hardware solution is used to test the connections between the safety monitor circuits SM and the fault collection and error management circuit 120a. In this way, the connectivity test may be executed in HW during the initialization phase of the processing system 10a, in particular during the diagnostic phase DP as part of the "built-in self-test" architecture. Accordingly, when the initialization phase is completed and the software is started at the step 3022, connectivity has already been tested and the software can rely on the fact that an error is not lost because of a broken connection between a safety monitor circuit SM and the fault collection and error management circuit 120a.

Specifically, a fault collection and error management circuit 120a is a dedicated hardware circuit configured to collect the error signals ERR of the processing system 10a. Here, each of these signals may be asserted, e.g., set to high, when a given failure occurs in the processing system 10a. These error signals ERR are generated by several safety monitor circuits SM distributed within the processing system 10a. For example, the safety monitor circuit $SM_{102}$ of a processing core 102, in particular the respective microprocessor 1020 is located near (or is integrated in) the processing core 102, i.e., the distance between the safety monitor circuit SM and the respective circuit to be monitored is usually smaller than the distance between the safety monitor circuit SM and the fault collection and error management circuit 120a. As mentioned before, in addition to monitoring given circuits, the safety monitor circuit SM may also monitor other conditions, such as a detection of a supply voltage, a temperature, or a clock frequency being out-of-range. Moreover, the fault collection and error management circuit 120a is a hardware circuit generating given internal (e.g., a reset or an interrupt) and/or external reactions (driving of the pin EP or setting the safety level of a pin SCP) for the error signals ERR.

As mentioned before, preferably these reactions are programmable for one or more of the error signals ERR. For example, in various embodiments, the fault collection and error management circuit 120a is connected to the communication system 114 and comprises a register interface.

For example, in order to control the internal reaction, this register interface may comprise for each error signal ERR a respective interrupt enable flag (bits IE in FIG. 5) and/or respective reset enable flag. Thus, as shown in FIG. 7, in case a given error signal ERR is asserted, the fault collection and error management circuit 120a may be configured to: when the respective interrupt enable flag is set, set an interrupt signal IRQ; and when the respective reset enable flag is set, set an internal reset request signal $IR_2$, which is provided to the reset circuit 116.

For example, the interrupt signal IRQ may be provided to a processing core 102, which may be configured to start a given software error handling routine in response to the interrupt. Generally, the fault collection and error management circuit 120a may also be configured to generate a plurality of interrupt signals IRQ. For example, in this case, the interrupt enable flag may be provided for each error signal. For example, this may be useful in order to handle different errors in a different manner (without having the need to read the error bits EB in order to understand the type of error) and/or in case of multi-core processing systems 10a, wherein one or more interrupt signals IRQ may be provided to each processing core 102.

As mentioned before, the reset management circuit 116 may be programmable, e.g., in order to specify which type of reset (e.g., destructive, functional or simple functional) should be executed in response to the signal $IR_2$. However, also in this case, the fault collection and error management circuit 120a may be configured to generate a plurality of reset request signals, which are associated with given reset types, i.e., the type of reset to be executed may be programmed by programming the fault collection and error management circuit 120a rather than the reset management circuit 116.

An external reaction is usually accomplished by a change, done in hardware, of the level of one or more error pins EP, thereby signaling the error event to an external circuit, and/or by setting the level of a safety-critical pin SCP. For example, in response to a change of the logic level of a pin EP, the external circuit may be configured to shut-down/switch-off the processing system 10a and optionally activate a second processing system, which may be a redundant processing system 10a, or a processing system implementing only a reduced set of back-up functionality. For example, this may be the case for an electromechanics braking systems.

As mentioned before, preferably these reactions are again programmable for one or more of the error signals ERR. Generally, in addition to or as alternative to the use of a register interface programmable via software instructions executed by a processing core 102, one or more of the reactions may also be programmable via the configuration data CD, i.e., the fault collection and error management circuit 120a may have associated a configuration data client, and the fault collection and error management circuit 120a may be configured by storing the respective configuration data together with the address of the respective configuration data client to the configuration data CD, which may thus be read during the optional configuration phase CP1, which in any case is prior to the diagnostic phase DP.

Figure 9:
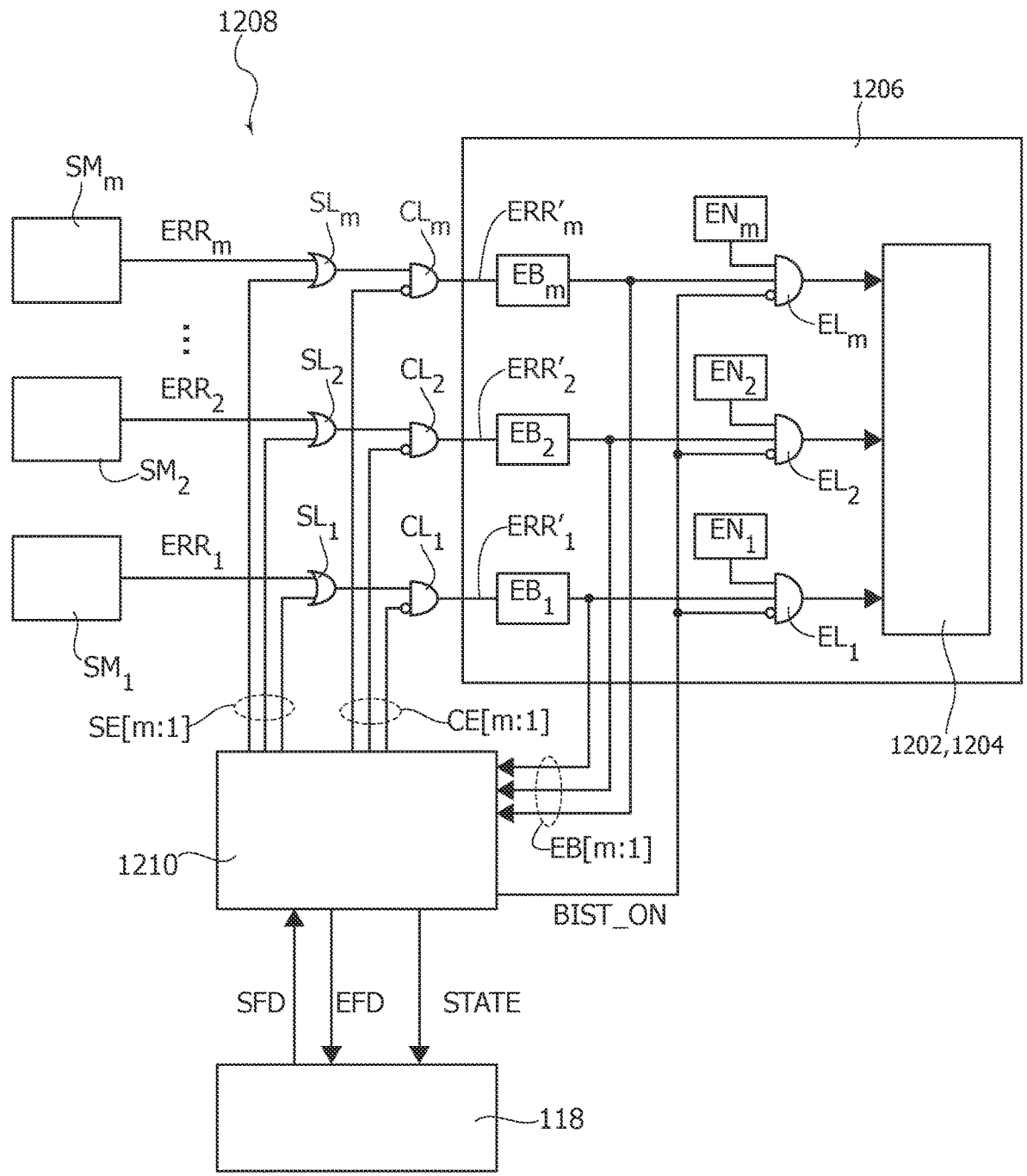
FIG. 9 shows a first embodiment of a fault collection and error management circuit and a respective control circuit adapted to be used in the processing system of FIG. 7.

FIG. 9 shows an embodiment of a fault collection and error management circuit 120a according to the present disclosure.

Specifically, in FIG. 9 are shown three blocks: a first block 1208 corresponding to an overwrite circuit configured to selectively overwrite the error signals $ERR_1, \ldots, ERR_n$ generated by the safety monitoring circuits SM; a block 1206 corresponding the portion of the circuit 120a handling the fault collection and error management; and a block 1210 corresponding to a control circuit, configured to perform the testing operations.

Specifically, the first block 1208 shows that with each error signal ERR may be associated a respective set circuit SL in the form of a combinational logic circuit, such as set circuits $SL_1, \ldots, SL_m$, and a respective clear circuit CL in the form of a combinational logic circuit, such as clear circuits $CL_1, \ldots, CL_m$. Specifically, the set circuits SL and the clear circuits CL are provided at the output of the respective safety monitor circuit SM and may also be integrated within the respective safety monitoring circuit SM. Accordingly, the circuits SL and CL may be used to generate a modified error signal ERR', i.e., modified error signals $ERR'_1, \ldots, ERR'_m$, by selectively overwriting the original error signal ERR. Specifically, by setting for each set circuit SL a respective set signal SE, i.e., signals $SE_1, \ldots, SE_m$ (schematically shown in vector form SE[m:1]), and for each clear circuit CL a respective clear signal CE, i.e., signals $CE_1, \ldots, CE_m$ (schematically shown in vector form CE[m:1]), the modified error signal ERR' may: correspond to the original error signal ERR, e.g., in case the respective set signal SE and the respective clear signal CE are de-asserted, e.g., set to low; be asserted (via the circuit SL), e.g., in case the respective set signal SE is asserted, e.g., set to high, and the respective clear signal CE is de-asserted, e.g., set to low; be de-asserted (via the circuit CL), e.g., in case the respective clear signal CE is asserted, e.g., set to high.

For example, in the embodiment considered, the clear signal CE has priority, i.e., the modified error signal ERR' is de-asserted when the respective clear signal CE is asserted (irrespective of the value of the respective error signal ERR and optionally the value of the respective set signal SE). For example, this permits to de-assert the modified error signal ERR', even in case an actual error is signaled via the error signal ERR.

Specifically, the modified error signal ERR' is generated prior to the transmission via the lines within the integrated circuit, i.e., the distance between the circuit SL (and similarly the circuit CL) and the respective safety monitoring circuit SM is smaller than the distance between the circuit SL (and similarly the circuit CL) and the circuit 1206 indeed handling the fault collection and error management.

For example, assuming that an error signal ERR is asserted when the respective logic level is high: the respective set circuit SL may be configured to selectively set the signal ERR' to high, e.g., by using a logic OR gate receiving at a first input terminal the respective original error signal ERR and at a second input terminal the respective set signal SE; and the respective clear circuit CL may be configured to selectively set the signal ERR' to low, e.g., by using a logic AND gate receiving at a first input terminal the signal at the output of the respective set circuit SL and at a second input terminal the inverted version of the respective clear signal CE.

Those of skill in the art will appreciate that also other combinational logic circuits may be used to selectively assert or de-assert the signal ERR' as a function of the signals SE and CE. For example, substantially the set and clear circuits SL and CL implement a selection/overwrite circuit 1208, which permits selection, for a given modified error signal ERR': the logic value of the respective original error signal ERR, the logic level indicating that the error signal is asserted (e.g., high), or the logic level indicating that the error signal is de-asserted (e.g., low).

For this reason, the signals SE and CE essentially represent a selection signal, which possibly may also use a different encoding in order to select the above values for the modified error signal ERR'.

Accordingly, in the embodiment considered, the modified error signal ERR' is transmitted within the integrated circuit and is received by the fault collection and error management circuit 1206. Accordingly, in the embodiment considered, the fault collection and error management circuit 1206 is configured to receive the modified error signals ERR' (instead of the original error signals ERR).

For example, in the embodiment considered, the fault collection and error management circuit 1206 comprises, again for each error signal ERR', a respective register EB (i.e., registers $EB_1, \ldots, EB_m$), such as a flip-flop or latch, for storing the logic level of the respective error signal ERR'. As mentioned before, these registers EB are optional.

Accordingly, in the embodiment considered, the control circuit 1210 is configured to: generate the selection signal (e.g., the signals SE and CE), monitor the signals provided by the registers EB (schematically shown again in vector form EB[m:1]) or directly the modified error signal ERR' received by the circuit 1206, determine whether the monitored signals are congruent with the selection signal (e.g., the signals SE and CE), and set a status signal STATE in order to indicate a connectivity error when the monitored signals are not congruent with the signals SE and CE or with the selection signal).

Specifically, the term congruent indicates that: when the selection signal is set in order to assert a given modified error signal ERR' prior to transmission (e.g., the signal SE is asserted and the signal CE is de-asserted), also the respective registers EB (or the respective modified error signal ERR' received by the circuit 1206) has to be asserted; and when the selection signal is set in order to de-assert a given modified error signal ERR' prior to transmission (e.g., the signal SE is de-asserted and the signal CE is asserted), also the respective registers EB (or the respective modified error signal ERR' received by the circuit 1206) has to be de-asserted.

As shown in FIG. 9, the control circuit 1210 may then provide the state signal STATE to the diagnostic circuit 118.

Specifically, as mentioned before, the test of the connectivity of the fault collection and error management circuit 120a should be performed during the diagnostic phase DP. For example, for this purpose, the control circuit 1210 may also receive the start signal SFD indicating a request to start the connectivity test. For example, the diagnostic circuit 118 may be configured to set the signal SFD during the diagnostic phase DP. Accordingly, in response to determining that the signal SFD is set, the control circuit 1210 may generate the selection signal (e.g., the signals SE and CE) and generate the state signal STATE as a function of the monitored signals provided by the registers EB or directly the modified error signal ERR' received by the circuit 1206.

Specifically, independently from the implementation of the selection circuit (e.g., circuits SL and CL), and the encoding of the selection signal (e.g., signals SE and CE), in various embodiments, the control circuit 1210 is configured to set the selection signal (e.g., signals SE and CE) in order to: assert each modified error signal ERR' for a first time period; and de-assert each modified error signal ERR' for a second time period.

In general, the control circuit 1210 may be configured to vary contemporaneously plural modified error signals ERR' (e.g., by varying plural selection signals, such as plural signals SE and CE), or preferably, vary only one modified error signal ERR' at each instant. In fact, this permits determining possible short-circuits between the modified error signals ERR' at the input of the fault collection and error management circuit 1206.

In various embodiments, once the connectivity test has been completed, the control circuit 1210 may also set a signal EFD indicating the end of the connectivity test to the diagnostic circuit 118. Generally, the signal EFD is optional, because the end of the connectivity test could also be signaled directly via the state signal STATE.

Figure 1:
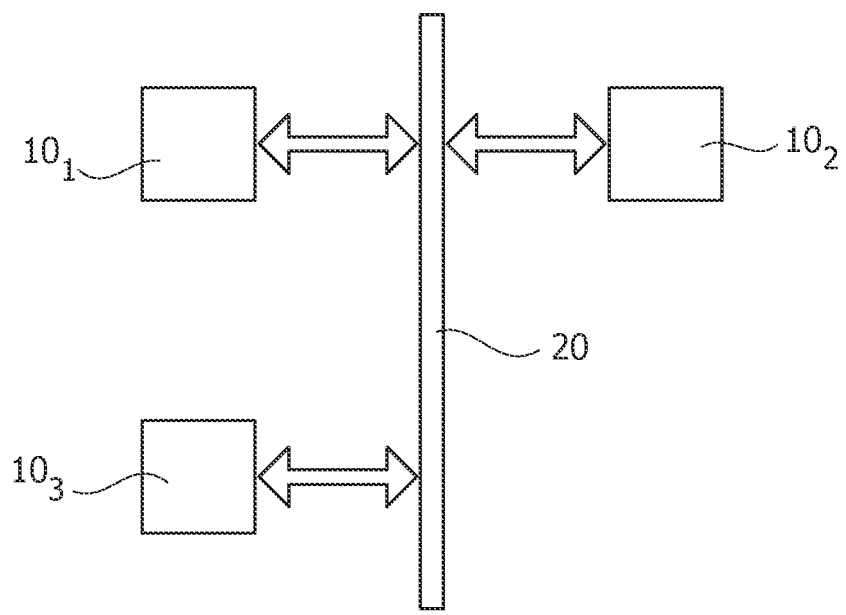
FIG. 1 shows an example of an electronic system comprising a plurality of processing systems.
Figure 2:
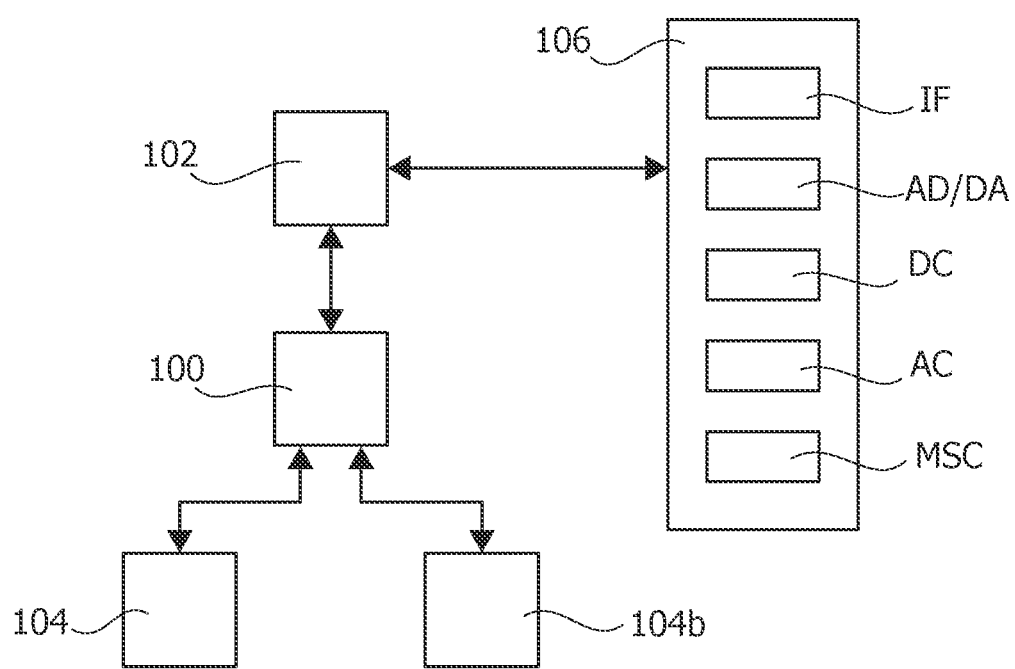
FIGS. 2 and 3 show examples of processing systems.
Figure 3:
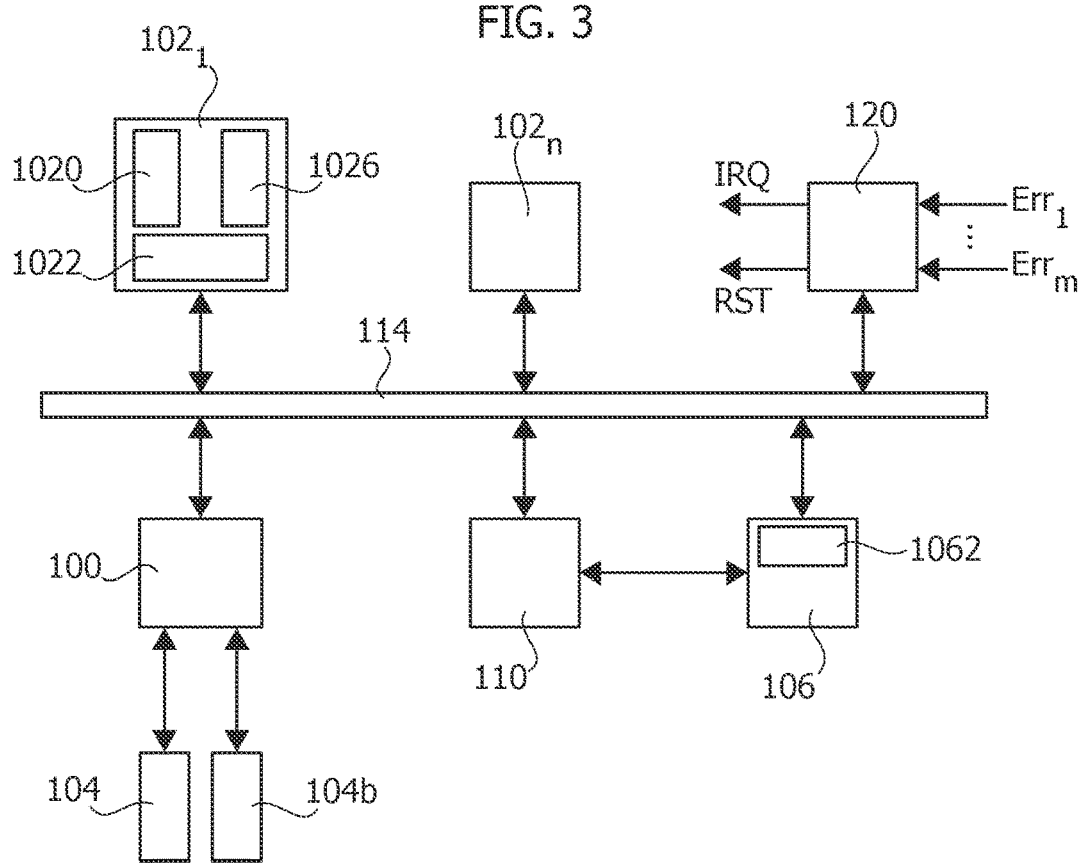
Figure 4:
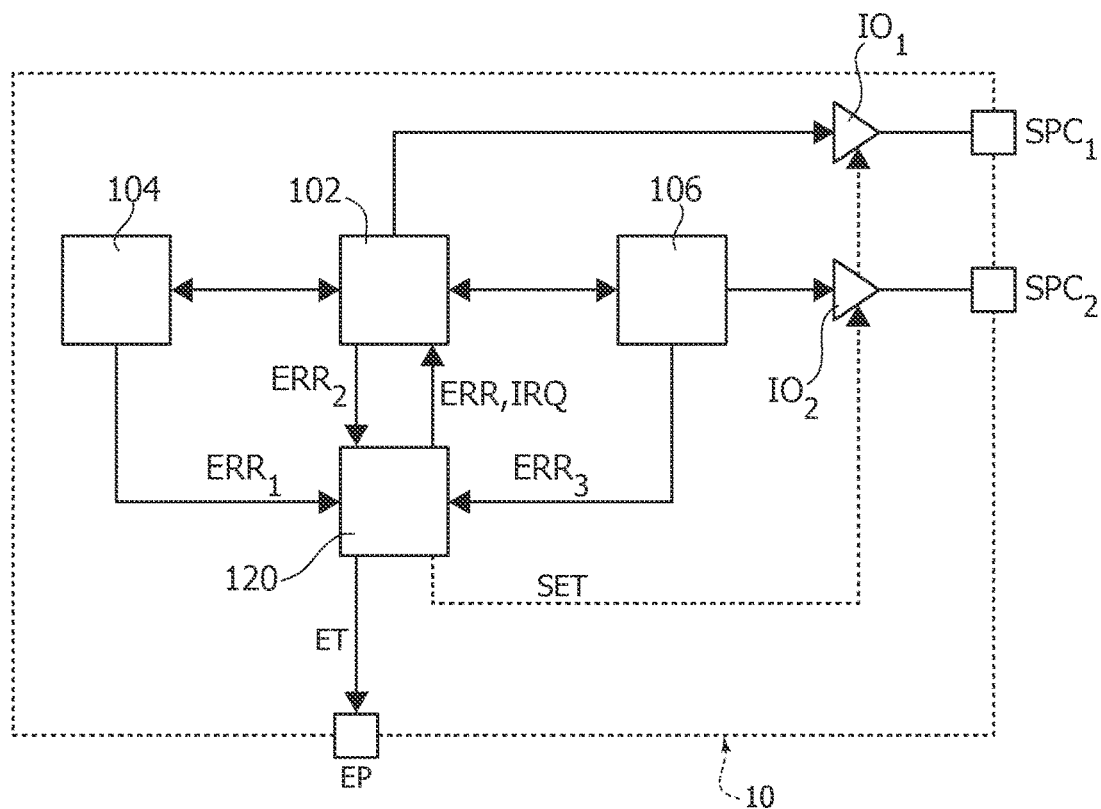
FIG. 4 shows an example of a processing system comprising a fault collection and error management circuit.
Figure 5:
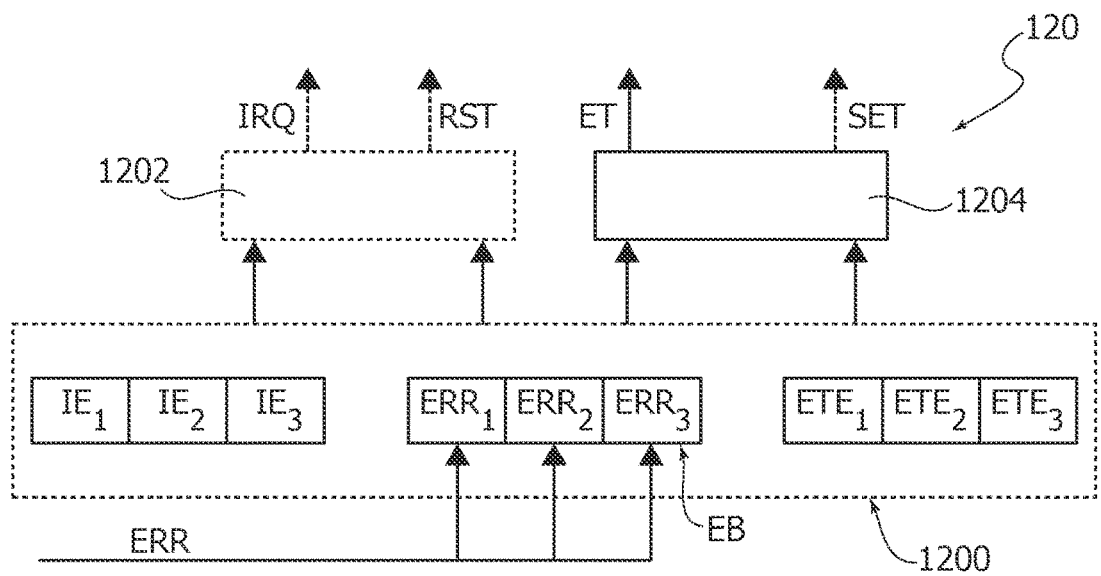
FIG. 5 shows an example of the fault collection and error management circuit of FIG. 4.
Figure 6:
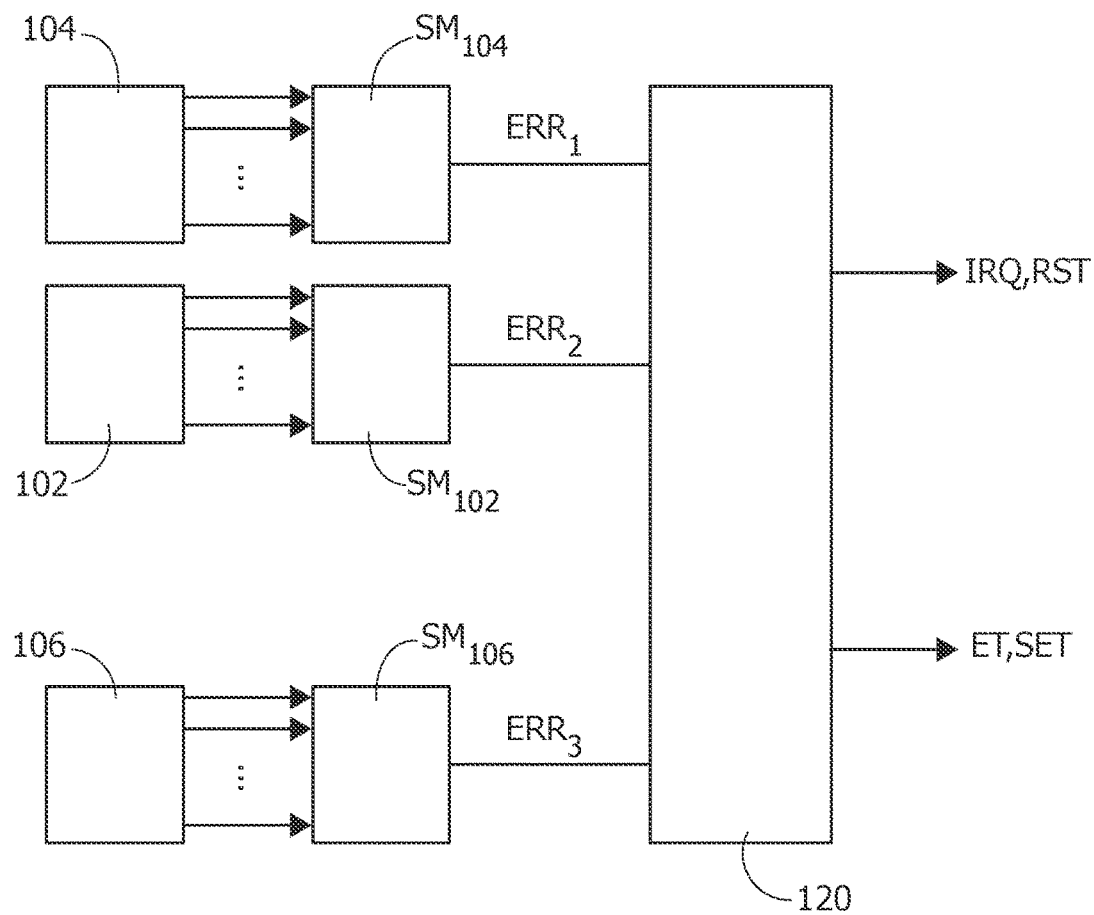
FIG. 6 shows an example of the connection between a plurality of safety monitoring circuits and the fault collection and error management circuit.

In line with the description of FIG. 5, the error bits EB (or directly the modified error signals received by the circuit 1206) may be provided to a fault reaction circuit 1202 configured to generate one or more signals indicating an internal reaction, such as the generation of a reset request signal $IR_2$ and/or an interrupt signal IRQ, and/or a fault reaction circuit 1204 configured to generate a one or more signals indicating an external reaction, such as the signal ET and/or the signal SET.

Moreover, in line with the description of FIG. 5, in various embodiments, each reaction may be enabled separately for each bit EB. For example, this is schematically shown in FIG. 9, via enable flags EN, i.e., enable flags $EN_1, \ldots, EN_m$ for the bits $EB_1, \ldots, EB_m$. For example, the enable flags EN may correspond to the previously mentioned flags for selectively enabling the generation of the reset request signal IR$_2$, the interrupt signal IRQ, the signal ET and/or the signal SET. Generally, the flag EN may also be a global enable flag for a given signal and the specific enable flags for enabling a given reaction may be implemented within the circuits 1202 and/or 1204. For example, in this case, the enable flags EN may be configured via the configuration data CD, while the specific reaction enable flags may be programmed via software instructions.

As shown in FIG. 9, in various embodiments, the control circuit 1210 may be configured to selectively disable the reaction circuit 1202 and/or the reaction circuit 1204. For example, for this reason, the fault collection and error management circuit 1206 may comprise for each bit EB a respective masking circuit EL (i.e., masking circuits EL$_1$, . . . , EL$_m$) in the form of a combinational logic circuit, such as an AND gate, configured to mask the respective bit EB provided to the reaction circuit 1202 and/or the reaction circuit 1204.

For example, in the embodiment considered, the control circuit 1210 is configured to generate a signal BIST_ON when the connectivity test is executed by the control circuit 1210 (e.g., between the instant when the signal SFD is set by the diagnostic circuit 118 and the instant when the signal EFD is set by the control circuit 1210). Accordingly, when the signal BIST_ON is set, each masking circuit EL disables the reaction by the reaction circuits 1202 and/or 1204.

Accordingly, in the embodiment considered, the control circuit 1210 is essentially a hardware finite state machine and may be implemented with a sequential logic circuit.

Accordingly, the control circuit 1210 and the selection circuits SL and CL permit to temporarily overwrite the error signal ERR. However, this implies that a possible error signaled by a safety monitor circuit SM before the connectivity test is executed may be lost. This may be avoided by running the connectivity test as a first test.

However, some components may already be running before the diagnostic phase DP is started, such as the memory 104 and the configuration circuit 108. Accordingly, these circuits may already set an error signal, e.g., in response to determining that at least part of the configuration data CD read from the memory 104 contain errors.

Figure 10:
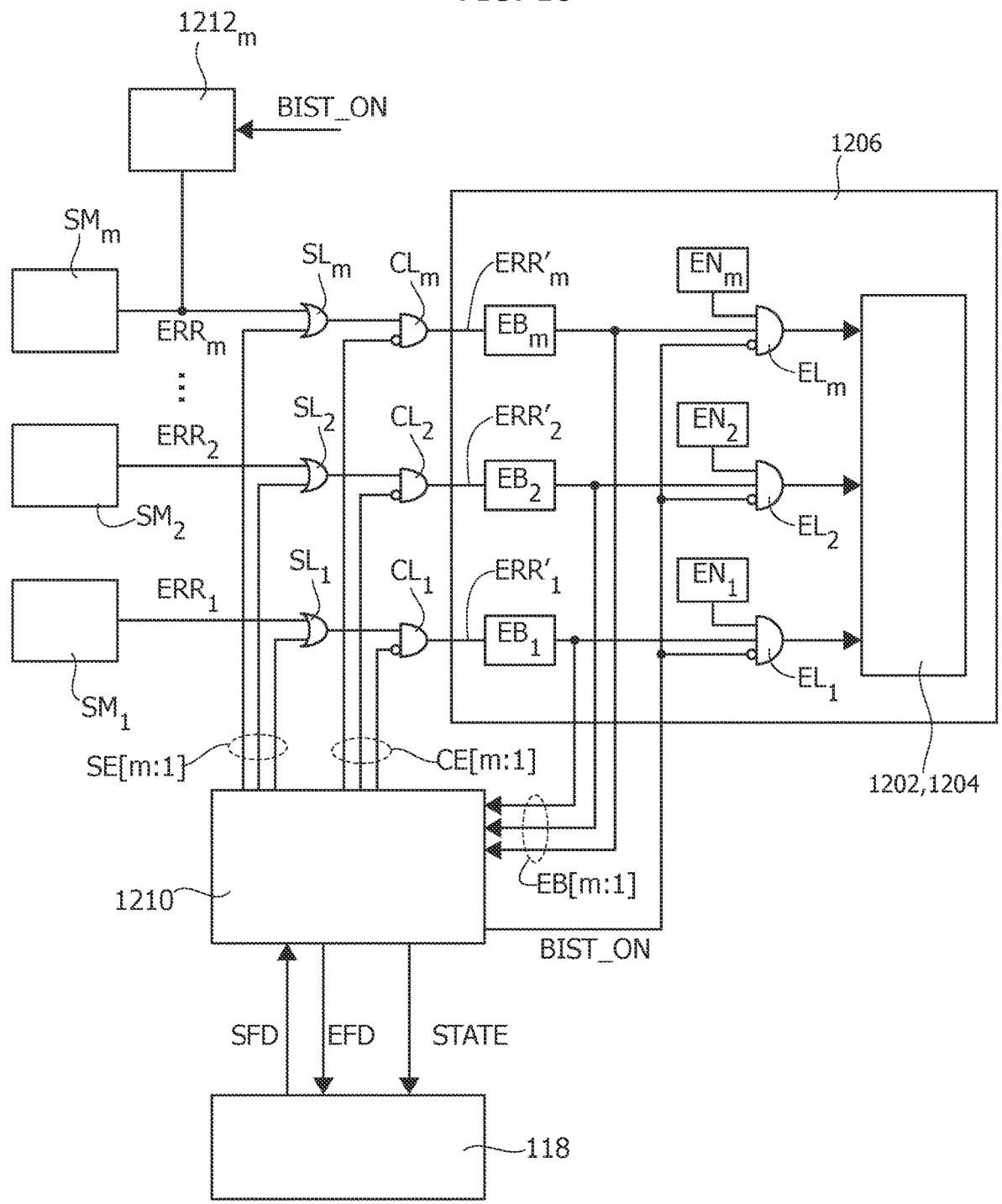
FIG. 10 shows a second embodiment of a fault collection and error management circuit and a respective control circuit adapted to be used in the processing system of FIG. 7.

Accordingly, as shown in FIG. 10, in various embodiments, the processing system 10a comprises a storage element 1212 between a safety monitor circuit SM and the respective selection circuit (e.g., circuits SL and CL), wherein the storage element 1212 is configured to maintain the value of the respective error signal ERR while the connectivity test is running. For example, the storage element 1212 may be implemented with a latch or flip-flop driven as a function of the signal BIST_ON.

Due to the fact that the connectivity test is run during the initialization phase, usually only a limited number of errors may occur. Accordingly, it is not necessary to store all error signals ERR, but only the error signals ERR possibly signaling an error before the connectivity test is run. For example, this is schematically shown in FIG. 10, where only the safety monitoring circuit SM$_n$ has associated a storage circuit 1212$_m$ configured to maintain the value of the error signal ERR$_m$.

Figure 11:
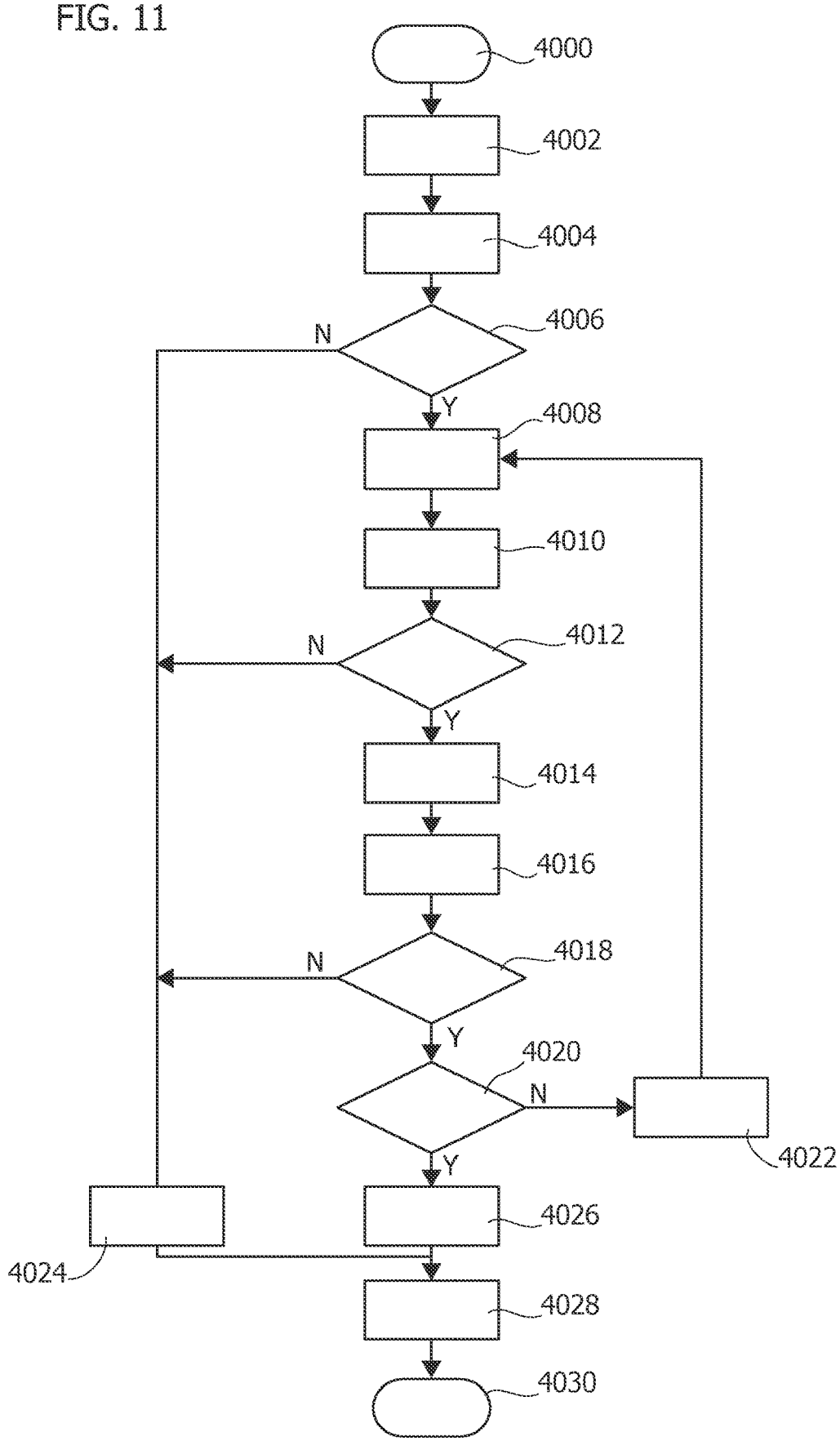
FIG. 11 is a flow-chart showing an embodiment of the operation of the control circuits of FIGS. 9 and 10.

FIG. 11 shows in more detail a possible embodiment of the operation of the control circuit 1210. As mentioned before, the connectivity test may be started in response to the start signal SFD received from the diagnostic circuit 118.

After a start step 4000, the control circuit 1210 sets at a step 4002 the selection signal (e.g., signals SE and CE) in order to de-assert all modified error signals ERR', e.g., by setting all clear signals CE to high and optionally all set signals SE to low. Next, the control circuit 1210 waits at a wait step 4004 for a given number of clock cycles in order to permit that the modified error signals ERR' are transmitted to the fault collection and error management circuit 1206. Generally, the minimum number of clock cycles depends on the maximum propagation delay for the transmission of the modified error signals ERR' and the clock frequency of the clock signal provided to the control circuit 1210, and may range, e.g., from a single clock cycle to several clock cycles.

At a following verification step 4006, the control circuit 1210 reads the values of the error bits EB (or directly the modified error signals ERR' received by the fault collection and error management circuit 1206).

In case at least one of the monitored signals (EB or ERR') is asserted (output "N" of the verification step 4006), e.g., set to high, the control circuit 1210 proceeds to an error step 4024, where the control circuit 1210 sets the signal STATE to a value being indicative of a connectivity error, e.g., sets the signal STATE to a first logic level, e.g., high. Next, the control circuit 1210 may set at a step 4028 the signal EFD in order to indicate that the connectivity test has been completed and the procedure terminates at a stop step 4030.

Conversely, in case all monitored signals (EB or ERR') are de-asserted (output "Y" of the verification step 4006), e.g., set to low, the control circuit 1210 sets at a step 4008 the selection signal (e.g., signals SE and CE) in order to assert a given modified error signal ERR'[i], e.g., by setting the respective clear signal CE[i] to low and the respective set signal SE[i] to high. Next, the control circuit 1210 may wait at a wait step 4010 again for a given number of clock cycles in order to permit that the modified error signal ERR'[i] is transmitted to the fault collection and error management circuit 1206.

At a following verification step 4012, the control circuit 1210 may thus read the value of the error bit EB[i] (or directly the modified error signal ERR'[i] received by the fault collection and error management circuit 1206). In case the monitored signal (EB[i] or ERR'[i]) is de-asserted (output "N" of the verification step 4010), e.g., set to low, the control circuit 1210 proceeds to the error step 4024, where the control circuit 1210 sets the signal STATE to the value being indicative of a connectivity error.

Conversely, in case the monitored signal (EB[i] or ERR'[i]) is asserted (output "Y" of the verification step 4010), e.g., set to high, the control circuit 1210 sets at a step 4014 the selection signal (e.g., signals SE and CE) in order to de-assert the given modified error signal ERR'[i], e.g., by setting the respective clear signal CE[i] to high and optionally the respective set signal SE[i] to low. Next, the control circuit 1210 may wait at a wait step 4016 again for a given number of clock cycles in order to permit that the modified error signal ERR'[i] is transmitted to the fault collection and error management circuit 1206.

At a following optional verification step 4018, the control circuit 1210 may again read the value of the error bit EB[i] (or directly the modified error signal ERR'[i] received by the fault collection and error management circuit 1206). In case the monitored signal (EB[i] or ERR'[i]) is asserted (output "N" of the verification step 4018), e.g., set to high, the control circuit 1210 may proceed to the error step 4024, where the control circuit 1210 sets the signal STATE to the value being indicative of a connectivity error. Conversely, in case the monitored signal (EB[i] or ERR'[i]) is de-asserted (output "Y" of the verification step 4018), e.g., set to low, the control circuit 1210 may proceed to a verification step 4020.

In case the verification step 4018 is omitted, the control circuit 1210 may also directly proceed to the verification step 4020.

Specifically, at the verification step 4020, the control circuit 1210 verifies whether the current given modified error signal ERR'[i] was the last modified error signal ERR'[i], e.g., i=n. In case the given modified error signal ERR'[i] was not the last modified error signal ERR'[n] (output "N" of the verification step 4010), e.g., i<n, the control circuit 1210 selects at a step 4022 the next modified error signal ERR'[i], e.g., increases the index i, and proceeds to the step 4008 for verifying the connectivity of the next modified error signal ERR'[i].

Conversely, in case the given modified error signal ERR'[i] was the last modified error signal ERR'[n] (output "Y" of the verification step 4010), e.g., i=n, the control circuit 1210 proceeds to a step 4026, where the control circuit 1210 sets the signal STATE to a value being indicative of a correct connectivity, e.g., sets the signal STATE to a second logic level, e.g., low. Next, the control circuit 1210 may set at the step 4028 the signal EFD in order to indicate that the connectivity test has been completed and the procedure terminates at the stop step 4030.

Accordingly, in the embodiment considered, the control circuit 1210 is configured to selectively assert in sequence the error signals ERR', each time asserting only a single error signal ERR'.

Generally, when using a binary signal STATE, one of the steps 4024 or 4026 may also be omitted, because the signal STATE could simply maintain a default value in this case.

Moreover, instead of using separate steps 4014 and 4016, these steps may also be combined in the steps 4010 and 4012. For example, at the step 4014, the control circuit 1210 may: set the set signal SE[i] to high and the clear signal CE[i] to low; and set all other clear signals CE to high and optionally all other set signals SE to low.

Moreover, in various embodiments, instead of verifying at the step 4012 a single signal EB[i] or ERR'[i], the control circuit 1210 may verify plural (and possible all) signals EB or ERR', and determine whether only the signal EB[i] or ERR'[i] is asserted. Similarly, the control circuit 1210 may be configured to verify at the step 4018 (when used) whether plural (and possibly all) signals EB or ERR' are de-asserted.

Figure 12:
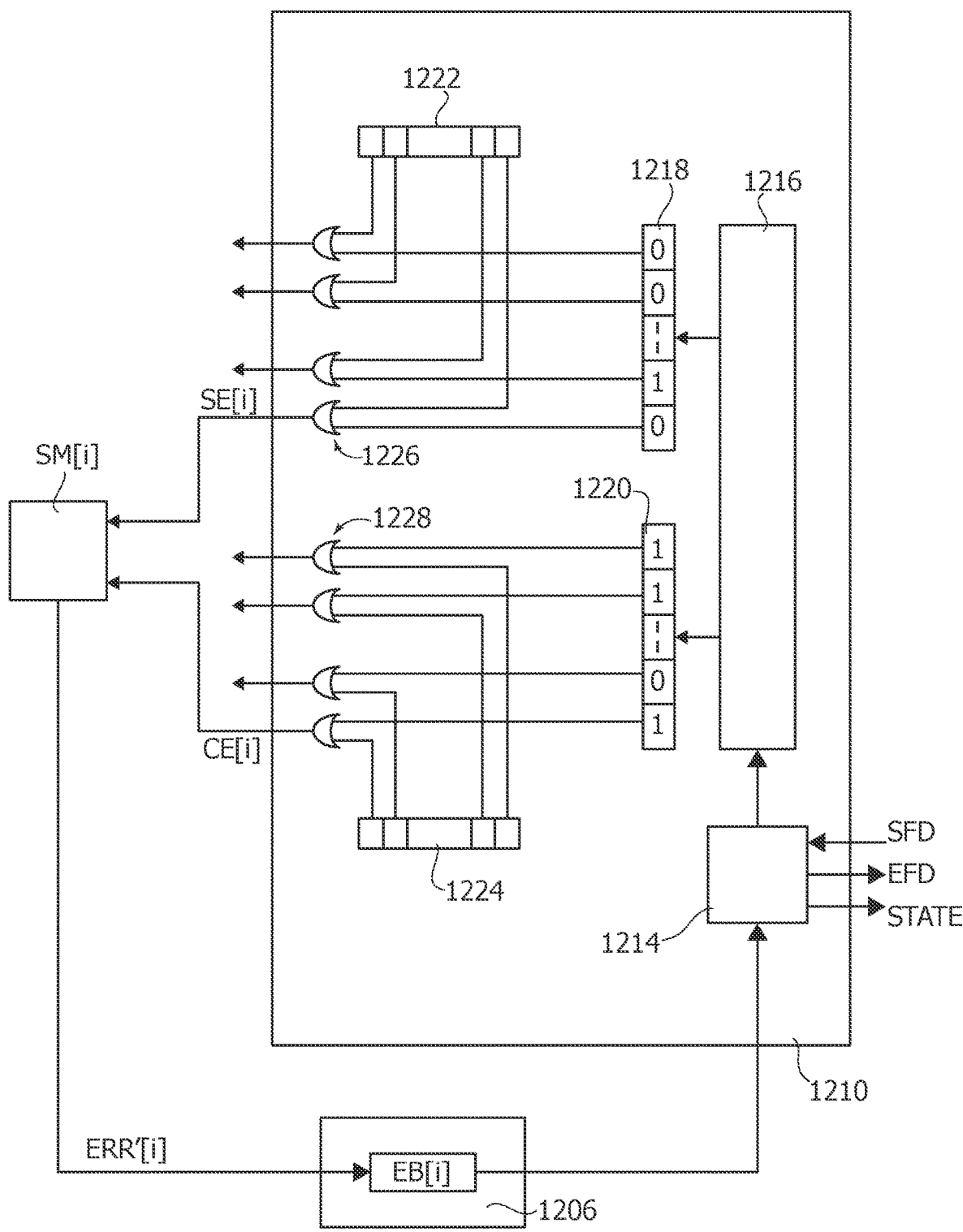
FIG. 12 shows an embodiment of the control circuits of FIGS. 9 and 10.

FIG. 12 shows a possible hardware implementation of the control circuit 1210.

In FIG. 12 a generic safety monitoring circuit SM[i] is also shown, wherein the selection circuit used to overwrite the error signal generated by the safety monitoring circuit SM[i] is directly integrated in the safety monitoring circuit SM[i], i.e., the safety monitoring circuit SM[i] provides directly the signal ERR'.

Specifically, in the embodiment considered, the control circuit 1210 comprises: a register 1218 configured to store the values of the set signals SE[n:1]; a register 1220 configured to store the values of the clear signals CE[n:1]; a combinational logic circuit 1216 configured to provide one or more control signals to the registers 1218 and 1220; and a state machine 1214 in the form of a sequential logic circuit 1214 configured to monitor the start signal SFD and the error bits EB[n:1] of the fault collection and error management circuit 1206 (or the error signals ERR'[n:1] received by the fault collection and error management circuit 1206) and generate one or more control signals for the combinational logic circuit 1216.

For example, in line with the description of FIG. 11, in response to determining that the start signal SFD is set, the state machine 1214 may set the control signal(s) provided to the circuit 1216 to a first value indicating a clear phase. Specifically, in various embodiments, when the control signal(s) have the first value, the combinational logic circuit 1216 is configured to set the bits of the register 1218 to "0" and the bits of the register 1220 to "1", thereby implementing the step 4002.

Next, the state machine 1214 may set the control signal(s) provided to the circuit 1216 to a second value indicating an initialization phase. Specifically, in various embodiments, the combinational logic circuit 1216 is configured to: set the first bit of the register 1218 to "1" and all other bits of the register 1218 to "0"; and set the first bits of the register 1220 to "0" and all other bits of the register 1220 to "1".

Accordingly, in this way is asserted the first error signal ERR[1], thereby implementing the step 4010 for the first error signal ERR[1].

Next, the state machine 1214 may control the value of the signal EB[1] (or ERR'[1]) and either: terminate the connectivity test by setting the state signal STATE to the error state and optionally setting the end signal EFD, thereby implementing the steps 4024 and 4028; or setting the control signal(s) provided to the circuit 1216 to a third value indicating a run phase.

Specifically, in various embodiments, during the run phase, the combinational logic circuit 1216 is configured to drive the registers 1218 and 1220 as shift registers, while applying to the serial input of the register 1218 a "0" and to the serial input of the register 1220 a "1". Thus, essentially, during the run phase, the register 1218 shifts the logic value "1" and the register 1220 shift the logic value "0", i.e., each time only a single error signal ERR' is asserted and the other error signals ERR' are de-asserted.

Accordingly, the state machine 1214 may control the values of the signals EB (or ERR'), and verify whether the error signal ERR'[i] for with the selection signal SE[i] is set to "1" and the clear signal CE[i] is set to "0" is asserted, while the other error signal ERR' are de-asserted.

Accordingly, the state machine 1214 may end the procedure by either: when an error is detected, setting the state signal STATE to the error state and optionally setting the end signal EFD; or when the last error signal ERR'[n] has been tested, setting the state signal STATE in order to indicate that the connectivity is working correctly and optionally setting the end signal EFD.

Specifically, in the embodiment considered, once the connectivity test is terminated, the content of the registers 1218 and 1220 is reset, e.g., as a function of the signal EFD.

Generally, instead of using shift registers 1218 and 1220, the state machine 1214 could also provide a count value, wherein the count value is increased until the count value corresponds to the number n of error signals ERR. For example, in this case, the combinational logic circuit 1216 may act as a decoder providing, for each count value, respective bit sequences to the registers 1218 and 1220. For example, in this case, the registers 1218 and 1220 may also be omitted. However, by using shift registers 1218 and 1220, the control circuit 1210 has a significantly reduced complexity.

In various embodiments, the control circuit 1210 comprises also further registers 1222 and 1224. In various embodiments, these registers 1222 and 1224 are connected to the communication system 114 and are programmable via software instructions executed by a processing core 102. Specifically, these registers 1222 and 1224 may be used to set via software instructions the values of the set signals SE and the clear signals CE (or the values of similar selection signals). For example, for this purpose, the set signals SE may be generated by combining the logic values of the registers 1218 and 1222, e.g., via logic OR gates 1226, and the clear signals CE may be generated by combining the logic values of the registers 1220 and 1224, e.g., via logic OR gates 1226.

Accordingly, by using a hardware solution, the connectivity test between the safety monitors SM and the fault controller 1206 may be executed in just a few clock cycles. This reduces also the complexity and cost associated with the development of complicated software to test the safety monitor connections.

Conversely, the registers 1222 and 1224 permit that a processing core 102 may assert or de-assert one or more of the error signals ERR' via software instructions. For example, in this way, the firmware may still be used to execute a complete connectivity test via software, or the processing core 102 may selectively test signal error signals ERR', e.g., in case an error is signaled via the fault collection and error management circuit 120a.

Generally, while the selection circuits, e.g., the gates SL and CL, are configured to assert or de-assert a respective error signal ERR' by overwriting the original error signal ERR generated by the respective safety monitoring circuit SM, in general, the selection signal may also be provided to the safety monitoring circuit and/or the circuit monitored by the safety monitoring circuit in order to indirectly assert or de-assert the error signal ERR generated by the safety monitoring circuit SM. This may also include that the safety monitoring circuit SM or the circuit monitored by the safety monitoring circuit simulates an abnormal behavior.

For example, in various embodiments, one or more safety monitor circuits SM are configured to not only signal a binary error signal ERR but also an additional error information signal identifying in detail the error. For example, in this case, the fault collection and error management circuit 120 or a separate circuit may be configured as logging circuit configured to store a log/table of these error information signals. For example, a safety monitor circuit associate with a memory may also provide with the error information signal data identifying the memory address of the read or write request. Similarly, a safety monitor signal associate with a communication interface may provide data concerning the communication having generated an error.

In various embodiments, such a logging circuit operates with a clock signal having a frequency, which is lower than the clock frequency of the monitored circuit. In fact, a memory or a communication interface may operate at a rather high frequency, while a (safe) low-speed clock signal is preferably used for the logging circuit. Accordingly, in this case, the safety monitor circuit SM may comprise a FIFO memory for storing the error information signal, thereby using a buffer for the transmission of the error information signal to the logging circuit.

In general, such a FIFO memory comprises a given number N of locations, which usually should not be too high, because such FIFO memories occupy space. However, this implies that the FIFO memory may be filled in case a plurality of consecutive errors are generated, e.g., in case of consecutive read operations to damaged areas of a memory.

Accordingly, also the full state of such a FIFO memory may correspond to an error condition, e.g., because some error conditions would not be logged. In this case, the FIFO full flag of the FIFO memory may be used as an additional error signal. Accordingly, in order to test the connectivity of such an error signal, the test circuit 1208 may comprise: a selection circuit used to overwrite the error signal; or a circuit used to selectively fill the FIFO memory.

For example, the FIFO may be filled by asserting a write enable signal of the FIFO memory, e.g., the set signal SE may be used to selectively assert the write enable signal of the FIFO memory. Accordingly, by maintaining the write enable signal asserted for N clock cycles, the full flag of the FIFO memory will be asserted, whereby the respective error signal is asserted. Conversely, the error signal may be de-asserted, e.g., by resetting the FIFO memory, e.g., the clear signal CE may be used to selectively reset the FIFO memory.

Moreover, by splitting the control circuit 1210 into plural control circuits, each control circuit 1210 could also test only a subset of the error signals, thus permitting that a parallel solution is used, thereby further reducing the execution time.

Accordingly, the features described in the foregoing have one or more of the following advantages: independence from the clock speed of the various circuits to be monitored and/or the safety monitoring circuits, because the overwrite function of the error signals ERR may be implemented via combinational logic circuits 1208, and the control circuit 1210 may either use a low-speed clock signal or wait one or more clock cycles until the error signals ERR' are propagated to the fault collection and error management circuit 1206; the control circuit 1210 may be configured to: a) sequentially test single error signals ERR', thereby implementing a reliable test of the connectivity between each safety monitoring circuit SM and the fault collection and error management circuit 120a, and/or b) assert and/or de-assert (possibly during the runtime of the processing core(s) 102) all error signals ERR', thereby implementing a fast connectivity test, e.g., in order to detect whether an error signal ERR' is stuck to high or low; and/or c) perform the above operations in parallel for different subsets of error signals ERR', e.g., first de-assert the error signals ERR' of each subset and then sequentially test the error signals ERR' of each subset, wherein these operations are executed in parallel for the various subsets; and the selection circuits 1208 and the control circuit 1210 may implemented with low complexity circuits.

Generally, the diagnostic circuit 118 and/or the control circuit 1210 may also signal an error of the connectivity test (as indicated via the signal STATE) to the fault collection and error management circuit 1206, e.g., by generating a further error signal ERR, which may then be used to generate one or more of the signals IRQ, $IR_2$, ET and SET.

Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:

1. A processing system comprising:
a processing core comprising a microprocessor;
a memory controller configured to read software instructions for execution by the processing core;
a plurality of safety monitoring circuits configured to generate a plurality of error signals by monitoring an operation of the processing core and the memory controller;
a fault collection and error management circuit implemented as a hardware circuit, the fault collection and error management circuit being configured to generate one or more reaction signals as a function of the plurality of error signals received from the plurality of safety monitoring circuits; and a connectivity test circuit configured to, during a diagnostic phase executed by the processing system after executing a reset phase and before executing a software runtime phase, test connectivity between the plurality of safety monitoring circuits and the fault collection and error management circuit, the connectivity test circuit comprising:
  a plurality of circuits configured to selectively assert or de-assert an associated error signal generated by a respective safety monitoring circuit using a corresponding selection signal, and
  a control circuit configured to set a status signal to a value indicating an error of the connectivity test in response to determining that an error signal of a first subset of error signals received by the fault collection and error management circuit is not de-asserted or an error signal of a second subset of error signals received by the fault collection and error management circuit is not asserted.

2. The processing system according to claim 1, wherein the control circuit is configured to:
  determine whether the error signals of the first subset received by the fault collection and error management circuit are de-asserted; and
  determine whether the error signals of the second subset received by the fault collection and error management circuit are asserted.

3. The processing system according to claim 2, wherein each circuit corresponding to each error signal comprises:
  a first combinational logic gate configured to selectively assert the respective error signal as a function of a first bit of the respective selection signal; and
  a second combinational logic gate configured to selectively de-assert the respective error signal as a function of a second bit of the respective selection signal.

4. The processing system according to claim 2, wherein the control circuit comprises:
  one or more registers configured to provide the selection signals; and
  a state machine configured to control the operation of the one or more registers in order to set the selection signals in order to de-assert the first subset of the error signals and assert the second subset of the error signals.

5. The processing system according to claim 1, wherein the connectivity test circuit is configured to de-assert all of the plurality of error signals, and to determine whether each error signal received by the fault collection and error management circuit is de-asserted.

6. A processing system comprising:
  a digital processing core comprising a microprocessor programmable via software instructions;
  a memory controller configured to read the software instructions from a non-volatile memory;
  a communication system connecting the processing core to the memory controller and a resource;
  a plurality of safety monitoring circuits configured to generate a plurality of error signals by monitoring the operation of the processing core, the memory controller, or the resource;
  a fault collection and error management circuit configured to:
    receive the plurality of error signals from the plurality of safety monitoring circuits, and
    generate one or more reaction signals as a function of the plurality of error signals;
  a reset circuit configured to selectively reset the processing system;
  a diagnostic circuit configured to selectively execute one or more tests of the processing system;
  wherein, in response to switching on the processing system, the processing system is configured to execute the following phases in sequence:
    a reset phase, wherein the reset circuit executes a reset of the processing system,
    a diagnostic phase, wherein the diagnostic circuit executes the one or more tests of the processing system, and
    a software runtime phase, wherein the microprocessor is started and executes software instructions; and
  wherein the processing system comprises a hardware connectivity test circuit configured to test, during the diagnostic phase, the connectivity between the plurality of safety monitoring circuits and the fault collection and error management circuit, wherein the hardware connectivity test circuit comprises, for each error signal, a circuit configured to selectively assert or de-assert the respective error signal generated by a respective safety monitoring circuit as a function of a respective selection signal, and a control circuit configured to:
    set the selection signals in order to de-assert a first subset of the error signals via the circuit,
    determine whether the respective error signals of the first subset received by the fault collection and error management circuit are de-asserted,
    set the selection signals in order to assert a second subset of the error signals via the circuit,
    determine whether the respective error signals of the second subset received by the fault collection and error management circuit are asserted, and
    in response to determining that at least one of the error signals of the first subset received by the fault collection and error management circuit is not de-asserted or at least one of the error signals of the second subset received by the fault collection and error management circuit is not asserted, set a status signal to a value indicating an error of the connectivity test.

7. The processing system according to claim 6, wherein the first subset of the error signals comprises all error signals, and wherein the control circuit is configured to:
  set the selection signals in order to de-assert all error signals via the circuit, and
  determine whether all error signals received by the fault collection and error management circuit are de-asserted.

8. The processing system according to claim 6, wherein the second subset of the error signals comprises a single error signal, and wherein the control circuit is configured to:
  set the selection signals in order to selectively assert the single error signal via the circuit, and
  determine whether the respective single error signal received by the fault collection and error management circuit is asserted.

9. The processing system according to claim 8, wherein the control circuit is configured to sequentially assert different single error signals.

10. The processing system according to claim 6, wherein the processing system comprises a plurality of connectivity test circuits configured to test, during the diagnostic phase, the connectivity between respective subsets of the safety monitoring circuits and the fault collection and error management circuit.

11. The processing system according to claim 6, wherein each safety monitoring circuit is configured to monitor one or more signals of the processing core, the memory controller or the resource and perform at least one of:
- a combinational analysis of one or more monitored digital signals;
- a sequential analysis of one or more digital monitored signals; and
- an analysis of one or more monitored analog signals.

12. The processing system according to claim 6, wherein each circuit comprises:
- a first combinational logic gate configured to selectively assert the respective error signal as a function of a first bit of the selection signal; and
- a second combinational logic gate configured to selectively de-assert the respective error signal as a function of a second bit of the selection signal.

13. The processing system according to claim 6, wherein the control circuit comprises:
- one or more registers configured to provide the selection signals; and
- a state machine configured to control the operation of the one or more registers in order to set the selection signals in order to de-assert the first subset of the error signals and assert the second subset of the error signals.

14. The processing system according to claim 13, wherein the one or more registers are shift registers.

15. The processing system according to claim 13, comprising:
- one or more further registers connected to the communication system and programmable via software instructions executed by the microprocessor; and
- a combinational logic circuit configured to generate the selection signals by combining the signals provided by the one or more registers and the one or more further registers.

16. The processing system according to claim 6, wherein the fault collection and error management circuit is arranged at a respective position within the processing system, wherein each safety monitoring circuit is arranged at a respective position within the processing system, wherein each circuit is arranged at a respective position within the processing system, and wherein, for each circuit, the distance between the positions of the circuit and the respective safety monitoring circuit is smaller than the distance between the positions of the circuit and the fault collection and error management circuit.

17. The processing system according to claim 6, wherein the fault collection and error management circuit is configured to generate, as a function of the plurality of error signals, at least one of:
- an interrupt signal provided to the microprocessor;
- a reset request signal provided to the reset circuit;
- a first digital signal provided to a terminal of the processing system; and
- a second digital signal used to set the output level of one or more safety critical terminals of the processing system.

18. The processing system according to claim 6, wherein the processing system is implemented as an integrated circuit.

19. A device comprising a plurality of the processing systems according to claim 6, wherein the plurality of processing systems are connected via a further communication system.

20. A method of operating a processing system comprising a control circuit, a fault collection and error management circuit, and a plurality of safety monitoring circuits, the method comprising:
- in response to the processing system being powered on, sequentially executing a reset phase, a diagnostic phase, and a software runtime phase; and
- executing, by a control circuit of the processing system, the following operations during the diagnostic phase to perform a connectivity test to test connectivity between the plurality of safety monitoring circuits and the fault collection and error management circuit:
  - setting selection signals to de-assert a first subset of error signals generated by the plurality of safety monitoring circuits,
  - determining whether the error signals of the first subset received by the fault collection and error management circuit are de-asserted,
  - setting the selection signals in order to assert a second subset of the error signals,
  - determining whether the error signals of the second subset received by the fault collection and error management circuit are asserted, and
  - in response to determining that at least one of the error signals of the first subset is not de-asserted or at least one of the error signals of the second subset is not asserted, setting a status signal to a value indicating an error of the connectivity test.

\* \* \* \* \*